US005652935A

United States Patent [19]
Kusaka

[11] Patent Number: 5,652,935
[45] Date of Patent: Jul. 29, 1997

[54] CAMERA CONTROLLING TRIPOD LOCKING

[75] Inventor: Yosuke Kusaka, Kanagawa-ken, Japan

[73] Assignee: Nikon Corporation, Tokyo, Japan

[21] Appl. No.: 655,898

[22] Filed: May 31, 1996

[30] Foreign Application Priority Data

Jun. 15, 1995 [JP] Japan .................................. 7-174237

[51] Int. Cl.$^6$ .............................................. G03B 29/00
[52] U.S. Cl. ........................................................ 396/428
[58] Field of Search ................................... 396/419–428; 348/143, 373, 376

[56] References Cited

U.S. PATENT DOCUMENTS 5,066,970  11/1991  Kakita et al. ..................... 396/428 X

*Primary Examiner*—Howard B. Blankenship
*Attorney, Agent, or Firm*—Oliff & Berridge

[57] ABSTRACT

An optical device system includes a lock member that locks the posture of a variable member relative to an anchoring member of a supporting device (e.g., a tripod), and a controller in the optical device that controls the state (locked or released) of the lock member. The lock member can be controlled in accordance with the operational state of the optical device so that it becomes possible to change the setup of the device through a simple operation and without letting go of the optical device.

25 Claims, 22 Drawing Sheets

CAMERA CONTROLLING TRIPOD LOCKING

BACKGROUND OF THE INVENTION

1. Field of the Invention

The present invention relates to optical device systems that use tripod heads.

2. Description of Related Art

A tripod-supported camera is one example of an optical device system using a tripod head. When a camera is mounted to the tripod with a tripod screw, anchoring the camera and changing the posture of the camera are effected using a manual posture locking mechanism and a posture varying mechanism provided in the tripod, respectively.

With conventional optical device systems, when the scene or object that is to be photographed by the camera (i.e., the camera setup) is to be changed, it is necessary to let go of the camera to release the tripod posture locking mechanism. Hence, changing the camera setup is not as easy as it is for hand-held models. In particular, for example, in an automatic focus camera, the automatic focus adjustment is performed in accordance with the operational state of the camera operation member, e.g., the shutter release button. Therefore, if the photographer has to release the camera to perform a setup change, then it is impossible to continue the automatic focus adjustment state in accordance with the operational state of the operation member prior to the setup change.

For example, a one-shot focus function is known wherein, after focusing has been achieved by depressing the camera release button half way, the focus adjustment state achieved thereby is preserved, i.e., the focus is locked. When the shutter release button is released in order to change the camera setup and the release button is again depressed half way to take a photograph after changing the setup, the automatic focus adjustment operation must be performed again because the focus state prior to changing the camera setup is not preserved. In addition, keeping the shutter release button half-depressed and locking or releasing the tripod posture with the other hand, in order to change the camera setup while keeping the camera focused, is virtually impossible with telephoto lenses and the like.

SUMMARY OF THE INVENTION

In view of the foregoing, it is an object of embodiments of the present invention to enable, in an optical device that uses a tripod head, setup changes that can be effected with high speed and by means of a simple operation, i.e. without letting go of the optical device.

In order to achieve the above and other objects, and to overcome the shortcomings in the prior art, an optical device system according to embodiments of the present invention includes a control device in the optical device (for example, a camera) that controls the locking and releasing of a lock member that locks the posture of the optical device relative to a support device (for example, a tripod).

In one embodiment, the system includes a support device having an anchoring member. A variable position member on which the optical device is mounted is capable of changing posture relative to the anchoring member. The lock member locks the posture of the variable member relative to the anchoring member. The control device controls the locking and releasing of the lock member.

The lock device can be controlled in accordance with the operational state of the optical device, so it is possible to change the camera setup in a simple procedure without letting go of the optical device. Thus, setup changes with high speed become possible, and ease of use is improved.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
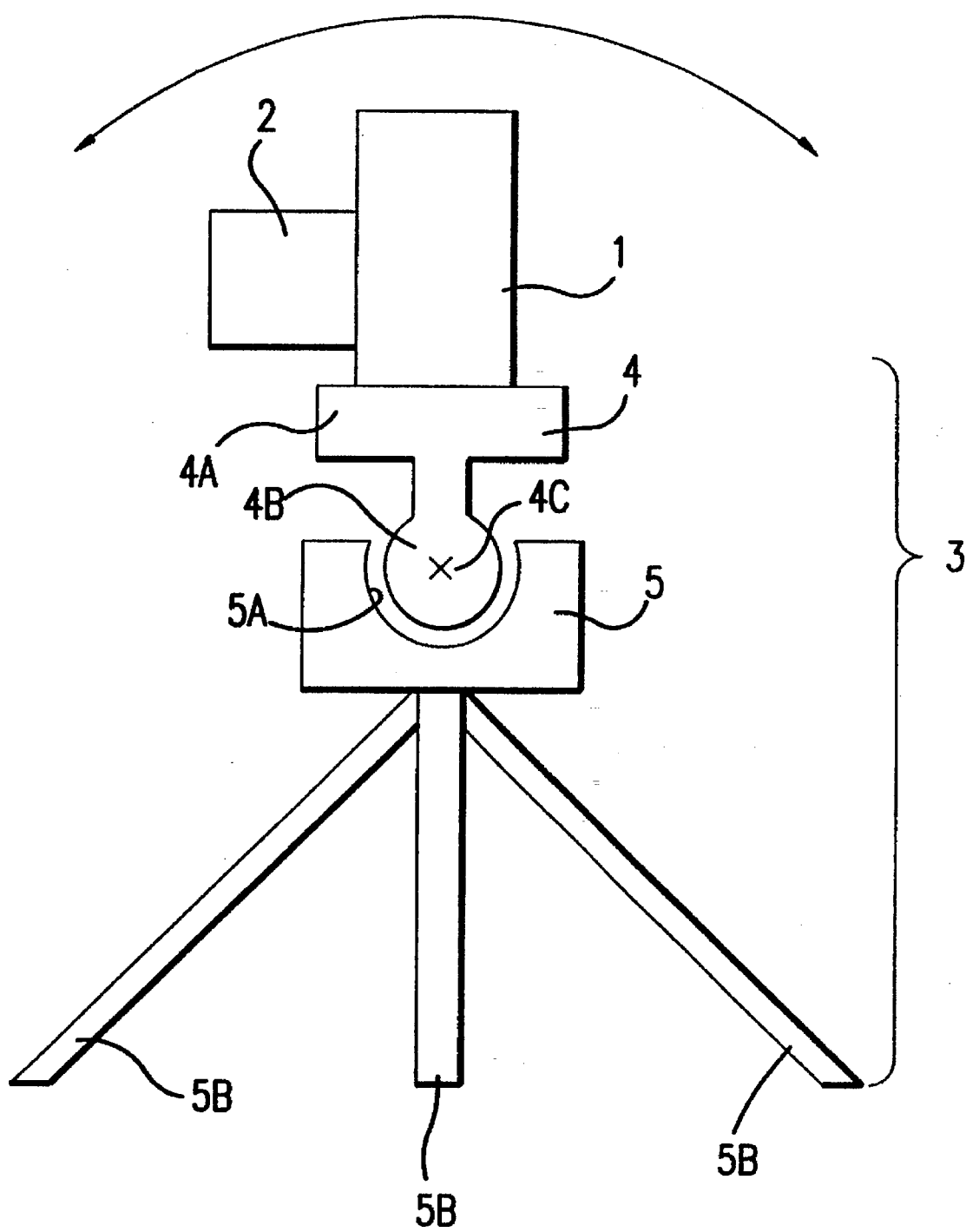
FIG. 1 is a schematic side view of one embodiment of an optical device system according to the invention.

FIG. 1 is a schematic side view of one embodiment of an optical device system according to the present invention. In this embodiment, lens 2 is configured so as to be interchangeably attached to camera body 1. Camera body 1 houses an automatic focus adjustment system that automatically adjusts the focus of the photographic optical system housed in the lens. Camera body 1 also has an operation member, e.g. a shutter release control button, used to control the automatic focus adjustment and taking of a picture.

The tripod head 3 has an anchoring member 5 and a variable member 4, the posture of which changes relative to the anchoring member 5. The variable member 4 includes an attachment portion 4A to which a camera body 1 or the like is attached, and a ball-shaped engagement portion 4B rotatably engaged with the anchoring member 5. The anchoring member 5 includes leg members 5B and an engagement portion 5A having a ball-shaped, concave portion that receives the engagement portion 4B of the variable member 4.

When the camera body 1 is attached to the attachment portion 4A, the camera body and the variable member 4 form an integral unit capable of rotating relative to the anchoring member 5 with the center 4C of the engagement portion 4B as the center of rotation. The variable member 4 can be locked in an arbitrary position relative to the anchoring member 5, or the lock can be released using the automatic posture lock system described below.

When the camera body is attached to the variable member, an electrical signal transmission line is formed between the camera body and the tripod head by means of connection terminals 18 (FIGS. 5 and 7) and 43 (FIG. 8), and various information is transmitted over this signal transmission line. Thus, the camera body 1 can control locking and unlocking (releasing) of the automatic posture lock system located in the tripod head 3 by means of this signal transmission line. In other words, the camera body 1 can control posture lock and posture lock release automatically in accordance with the operational state of the operation member located in the camera body 1 and in accordance with the operational state of the automatic focus adjustment apparatus.

Figure 2:
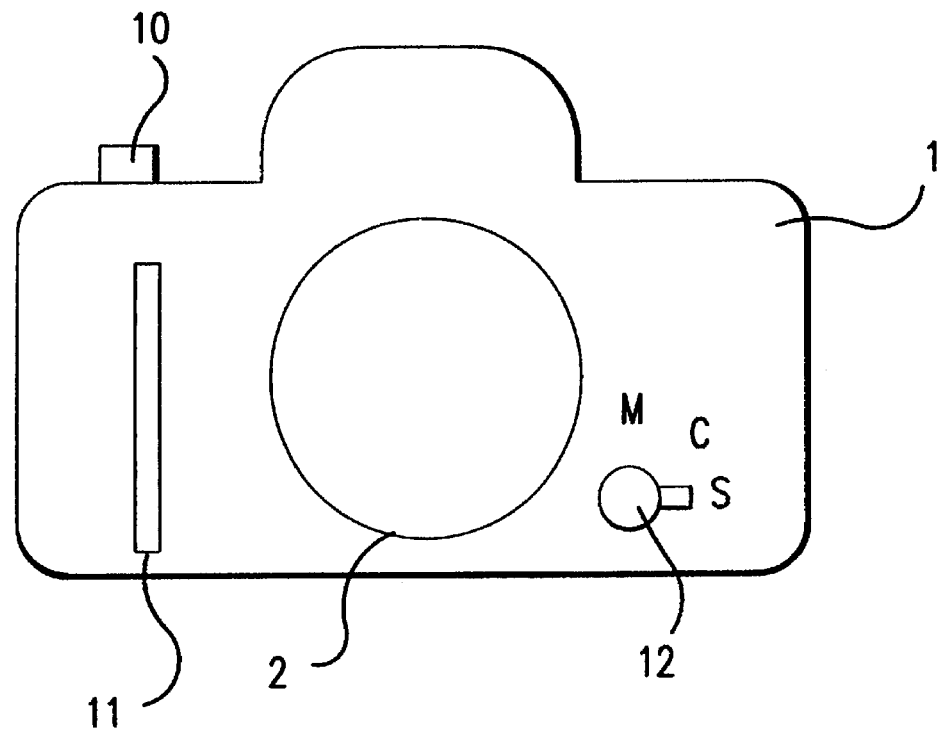
FIGS. 2 and 3 are schematic front and rear views, respectively, of a camera used in the optical device system shown in FIG. 1.

FIG. 2 is a schematic front view of the camera body 1. A release button 10 is provided on the top, left side of the body 1, and a grip sensor 11 is provided on the left side of the front of the camera body in a position to be pressed when the camera body 1 is held by the photographer. The grip sensor 11 is a pressure sensor that detects whether the camera body 1 is being held by the photographer. Other types of sensors, such as heat sensors, for example, also can be used to detect grasping by a photographer. A focus mode selection switch 12 is provided on the bottom, right side of the front of the camera body 1 and is used to select the focus adjustment mode.

The release button 10 is an operational member that is open when not being operated and is completely depressed after passing through a half-depressed position when operated by the photographer. Automatic focus adjustment starts when this button is depressed half way, and the photograph is taken when this button is depressed completely.

When the focus mode selection switch 12 is set to the S position, the camera is in the one-shot focus mode, i.e., a focus mode that locks the focus adjustment after the camera has been properly focussed by the automatic focus adjustment apparatus. When the focus mode selection switch is set to the C position, the camera is in the continuous focus mode, i.e., a focus mode in which the focus adjustment is continuously conducted by the automatic focus adjustment apparatus when the button is depressed half way. When the focus mode selection switch is set to the M position, the camera is in the manual focus mode, i.e., focus adjustment is performed manually and automatic focus adjustment by the focus adjustment apparatus is prevented.

Figure 3:
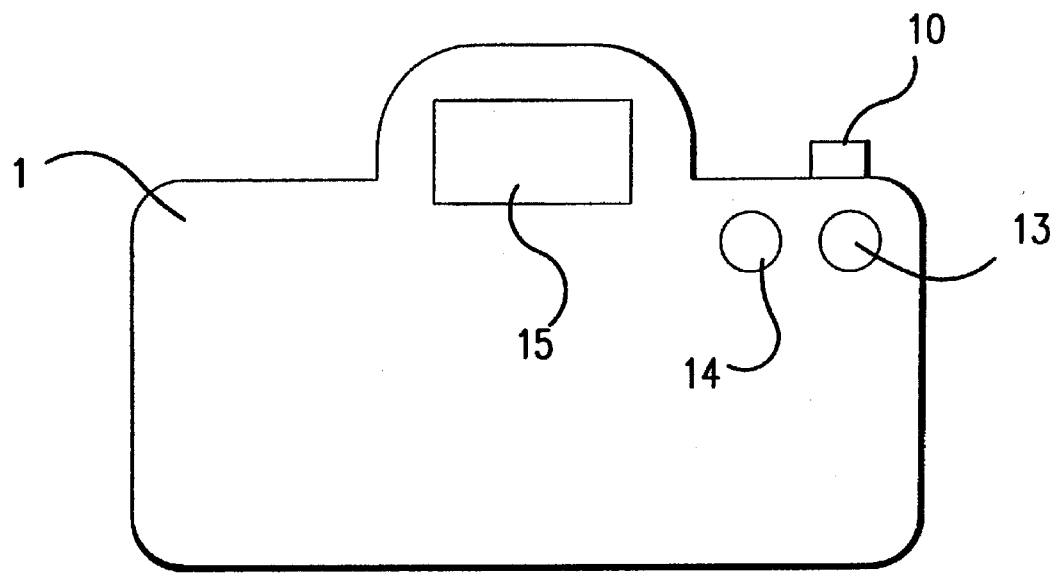

FIG. 3 is a schematic rear view of the camera body 1. The camera body has a posture lock release button 13 and a focus lock button 14 on the upper, right side of the back. The object being photographed can be viewed through the lens by means of the viewfinder eyepiece unit 15.

The posture lock release button 13 controls the automatic posture lock system in the tripod head 3 from the camera body 1. When the posture lock release button is not depressed, the automatic lock member automatically locks the posture of the camera; the posture lock is released only while this button is being operated. The posture lock release button 13 is comprised of a self-returning switch. Because the device is designed so that the posture lock is released only while the posture lock release button 13 is being depressed, it is not necessary to hold the camera when the posture lock release button is not being depressed.

The focus lock button 14 enables automatic focus adjustment. It can be used when the camera setup is altered after already having focussed on an object in the continuous focus mode.

Figure 4:
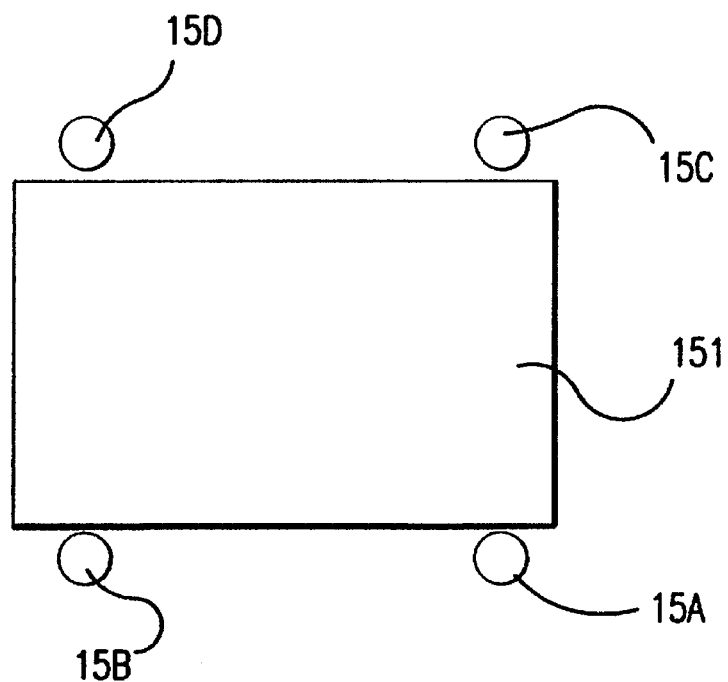
FIG. 4 is a schematic view of a photographic picture panel.

With the viewfinder eyepiece unit 15, it is possible to observe the object being photographed in the field 151 of the photographic picture shown in FIG. 4. It is also possible to communicate information about the focus adjustment state and the posture lock state through display members 15A, 15B, 15C, and 15D, which are positioned around the outside of the picture plane.

In the present example, display member 15A displays the focus adjustment state. It turns on when the camera is properly focused, and it flashes when it is impossible to focus the camera properly.

Display member 15B displays the posture lock state by turning on when the posture is locked. Because the posture lock state can be determined while looking through the viewfinder eyepiece unit 15, the posture lock can be released while still observing the subject, and altering the camera setup is simplified.

Display member 15C displays the state of attachment to the tripod head 3, and this member turns on when the camera 1 is attached to the tripod head 3. Thus, it is possible to verify the attachment of the camera to the tripod head 3 while continuing to observe the photographic subject through the viewfinder eyepiece unit 15.

Display member 15D indicates the type of tripod head 3 being used. This member turns on when the tripod head 3 to which the camera 1 is attached is one for which posture locking control is possible through the camera. Because the type of tripod head 3 can be determined by means of display member 15D, it is possible to verify whether posture lock control is possible via the camera while still observing the subject through the viewfinder eyepiece unit. It will be appreciated that the display members 15A, 15B, 15C, and 15D may communicate by means other than simply turning on, flashing, and turning off. For example, they may display various colors or make assorted sounds or display textual messages.

The various operational members are positioned so that when the camera body 1 is held, release button 10 can be operated using the right index finger, and the posture lock release button 13 and focus lock button 14 can be operated using the right thumb. Thus, it is possible to release the posture lock using just the right hand and without removing the index finger from the shutter release control button. Consequently, it is possible to make rapid posture changes and take photos quickly.

Figure 5:
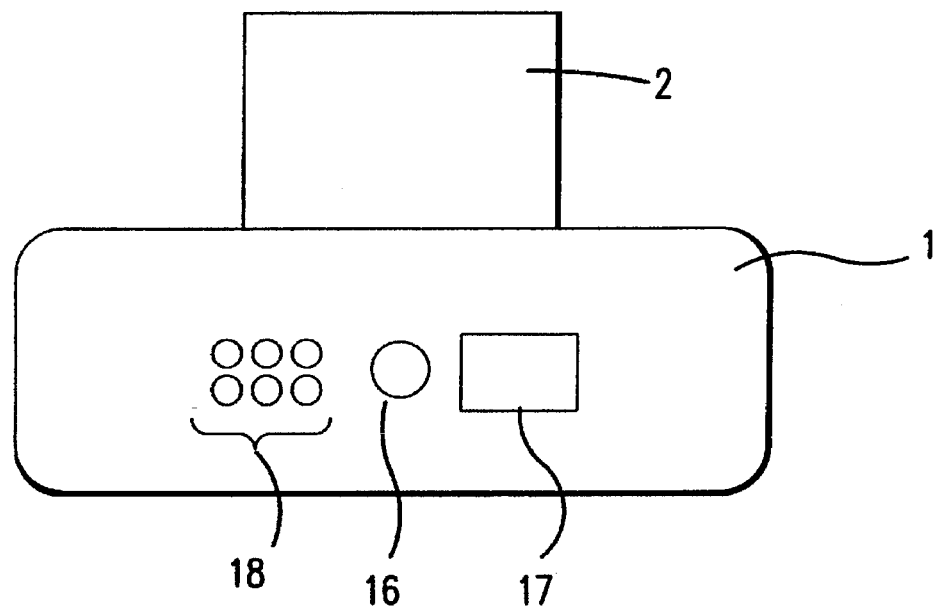
FIG. 5 is a schematic bottom view of a camera used in the optical device system shown in FIG. 1.

FIG. 5 is a schematic view of the bottom surface of the camera body 1, with a tripod screw hole 16 and a connection terminal 18 positioned near the center of the bottom surface of the body 1. The tripod screw hole 16 engages a tripod screw 41 (see FIG. 9) to secure the camera to the tripod head 3. A tripod head detector 17 is housed in the camera body 1 and determines when the tripod screw 41 is fully engaged with the tripod screw hole 16. Connection terminal 18 forms a power source line and a signal communication line to transmit information between the camera body 1 and the tripod head 3. Camera controller 19 (FIG. 14), lens driving controller 7, and focus detector 6, which can be, for example, separate or parts of a common special purpose integrated circuit (e.g., ASIC) or suitably programmed general purpose computer (e.g., microprocessor, microcontroller), comprise the automatic focus adjustment apparatus to be described below, are housed in the camera body 1.

Figure 6:
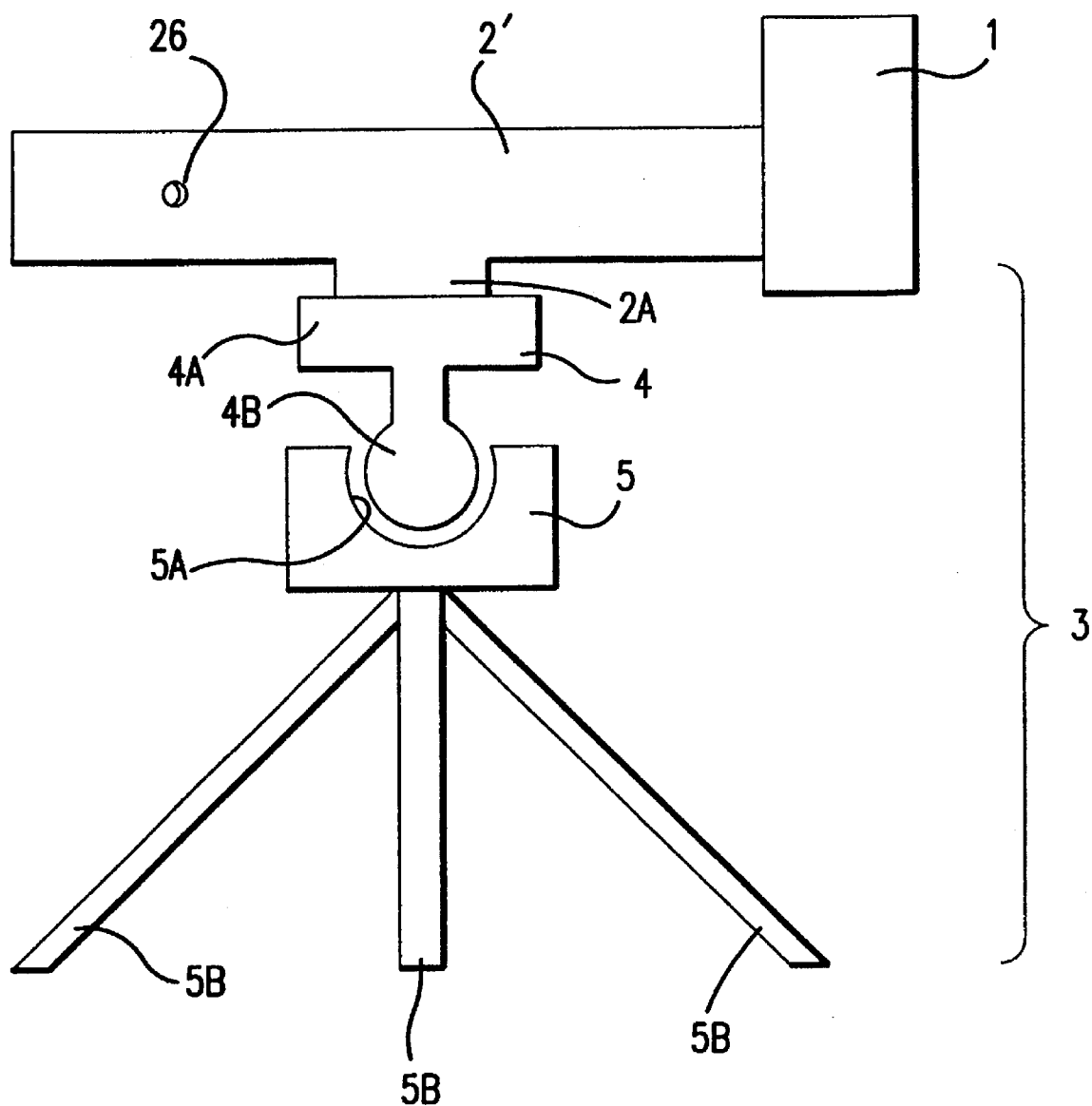
FIG. 6 is a schematic side view of another embodiment of an optical device system according to the invention.

FIG. 6 is a schematic side view showing an arrangement in which the lens 2' is attached to the tripod head 3. In particular, the lens is attached to the variable member 4A of the tripod head 3 by means of a tripod seat 2A. Lens operation member 26 is located on the lens and functions as a substitute for the operation member provided on the camera body, i.e., release button 10, posture lock release button 13, or focus lock button 14. Because the lens operation member 26 is positioned on the front side (the subject side) of the tripod seat 2A, it is possible to hold the camera 1 and lens 2' with the tripod seat 2A interposed therebetween. Consequently, it is possible to rotate the camera about the tripod seat 2A with good balance, even while operating the operation members on the lens 2' side and the camera 1 side so as to change the setup when the posture lock is released.

Figure 7:
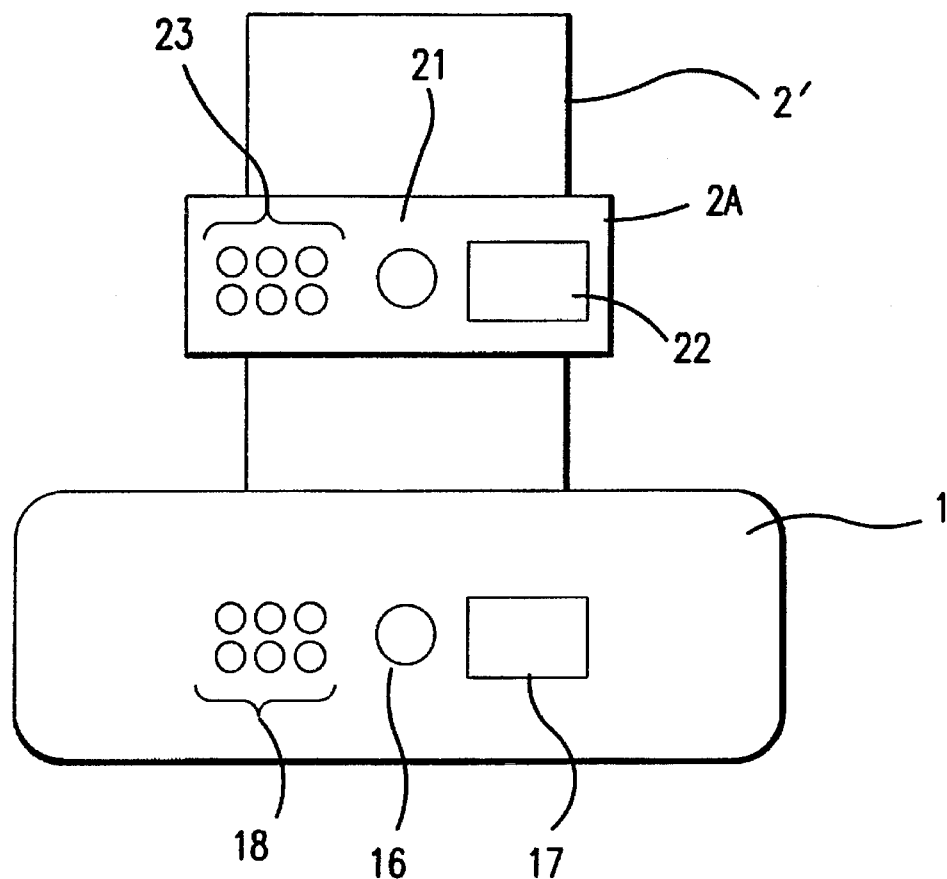
FIG. 7 is a schematic bottom view of a camera used in the optical device system shown in FIG. 6.

FIG. 7 is a schematic view of the bottom surface of the lens 2'. It has a tripod screw hole 21 and a connection terminal 23 positioned near the center of the bottom surface of the tripod seat 2A. Tripod screw hole 21 engages tripod screw 41 (see FIG. 8) to attach the lens 2' to the tripod head 3. The tripod head detector 22 is housed in the lens 2' and determines when the tripod screw 41 is fully engaged with the tripod screw hole 21.

Connection terminal 23 forms a power source line and a signal communication line to transmit information between the lens 2' and the tripod head 3. The photography optical system 24 and lens controller 25, described below, and which can be an ASIC or programmed CPU, for example, are housed in the lens 2 or 2'.

Figure 8:
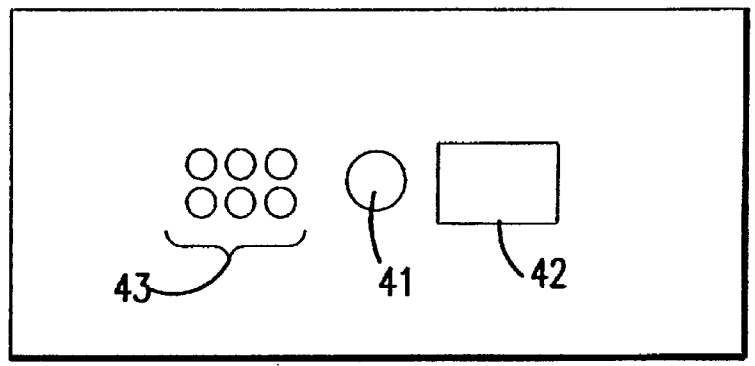
FIG. 8 is a schematic plan view showing an attachment part of a tripod head used with an optical device system according to the invention.

FIG. 8 is a schematic plan view showing the top surface of the attachment part 4A of the variable member 4. It includes a tripod screw 41 and a connection terminal 43 provided near the center. As noted above, the tripod screw 41 is used to attach either the camera body 1 or the lens 2' to the variable member 4, and is operated manually by the photographer. Connection terminal 43 forms a power source line and a signal communication line to transmit information between the tripod head 3 and the camera body 1 or the lens 2'.

Attachment detector 42 is also housed in the variable member 4 and detects when the tripod screw 41 is fully engaged with either the camera body 1 or the lens 2'. Attachment detection may be performed, for example, by detecting the position of the tripod screw 41 relative to the variable member 4 or by detecting the amount of force (pressure) the tripod screw 41 applies to the variable member 4. As another example, detector 42 and either detectors 17 or 22 can form part of a circuit that is closed when the camera 1 or lens 2' is mounted to and properly engaged with the variable member 4.

Figure 9:
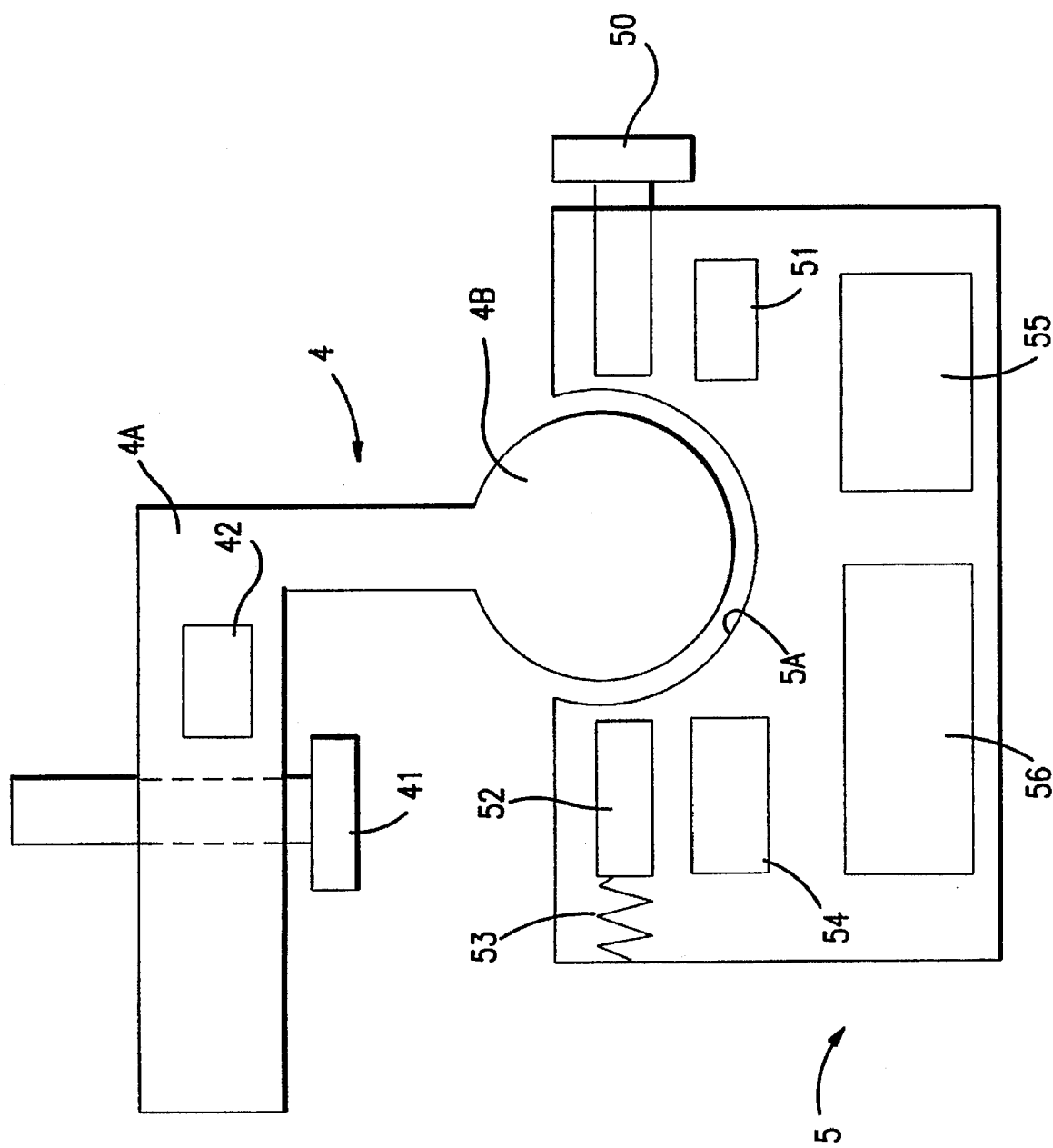
FIG. 9 is a schematic side view of a tripod head assembly used in the optical device system shown in FIG. 1.

FIG. 9 is a schematic side view illustrating details of the tripod head 3. Tripod screw 41 and attachment detector 42 are provided in the variable member 4 of the tripod head 3. A manual posture lock screw 50, a manual posture lock detector 51, an automatic posture lock member 52, a spring 53, an electromagnet 54, a posture lock release button 55, and a tripod head controller 56 (which also can be, for example, an ASIC or programmed CPU) are housed in the anchoring member 5 of the tripod head 3.

The manual posture lock screw 50 is turned to lock the posture of the variable member 4 by penetrating the engagement portion 5A of the anchoring member 5, and is turned in the opposite direction to release the posture lock by virtue of the screw being loosened. The manual posture lock detector 51 detects a posture lock state effected by tightening the manual posture lock screw by measuring the position of the manual posture lock screw or the amount of force (pressure) that the manual posture lock screw 50 exerts on the anchoring member 5. The manual posture lock screw 50 and the manual posture lock detector 51 together comprise a manual posture lock device 57.

The automatic posture lock member 52 is caused to penetrate the engagement unit 5A by spring 53. It is forced to make contact with the ball-shaped engagement portion 4B of the variable member 4, so that the posture of the variable member 4 is locked relative to the anchoring member. When electricity is supplied to the electromagnet 54, the automatic posture lock member 52 retracts from the ball-shaped engagement unit 4B so that the posture lock is released. Because electricity is required to remove the automatic posture lock, the posture lock will be retained if the power source is cut.

The automatic posture lock member 52, the spring 53, and the electromagnet 54 together form an automatic posture lock device 58. The automatic posture lock device 58 may also consist of structure other than that described above so long as control of posture locking and unlocking are possible automatically. For example, it is possible to drive the automatic posture lock member using a motor in place of the electromagnet 54.

The posture lock release button 55, which is composed of a self-returning switch, is used to release the posture lock effected by the automatic posture lock device 58. The posture lock state is released only when the button 55 is pressed. Because the posture lock is released only when the posture lock release button is pressed, it is not necessary to hold the camera 1 when the button 55 is not being pressed. The tripod head controller 56 receives information as to the posture lock state of the manual posture lock device 57 and controls the automatic posture lock device 58 in accordance with the operation of the posture lock release button 55.

In the above-described structure, the camera body 1, the lens 2' and the tripod head 3 exchange information through electrical signals, but it would also be appropriate for information to be exchanged using optical communication. This would prevent electrical problems caused by rain or the like entering the attachment surface when the camera body 1 or lens 2' are not mounted to the tripod head 3.

In addition, it would also be appropriate to have a structure wherein the connection terminals of the camera body 1, lens 2', and the tripod head 3 are normally covered by a cover member so as not to be exposed, and for the connection terminals to be exposed and make contact with each other by causing the cover member to move when attaching the camera to the tripod head using the tripod screw or the like. This would prevent short-circuiting due to rain or poor or failed connections due to dirty connection terminals.

Figure 10:
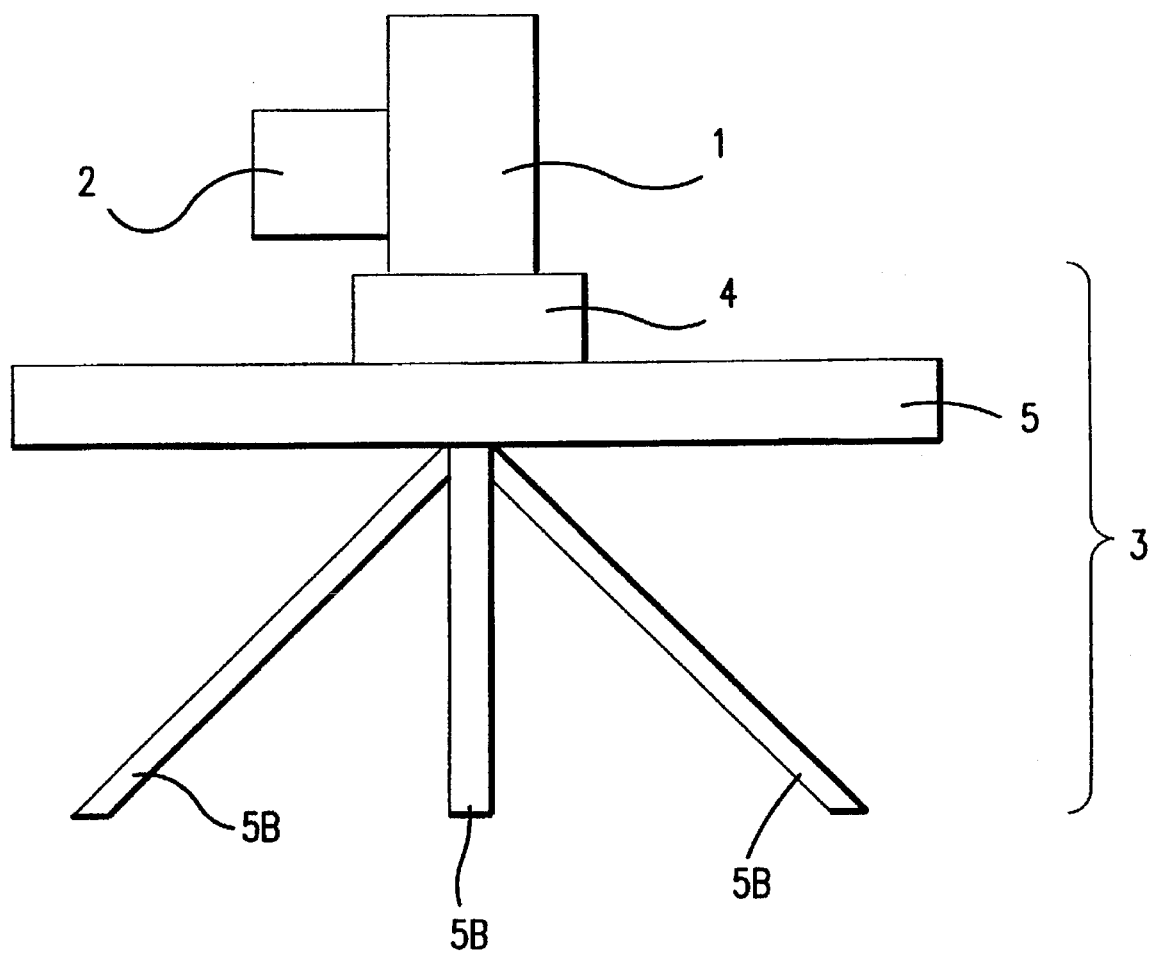
FIGS. 10, 11, 12, and 13 are schematic side views showing other embodiments of optical device systems according to the invention.
Figure 11:
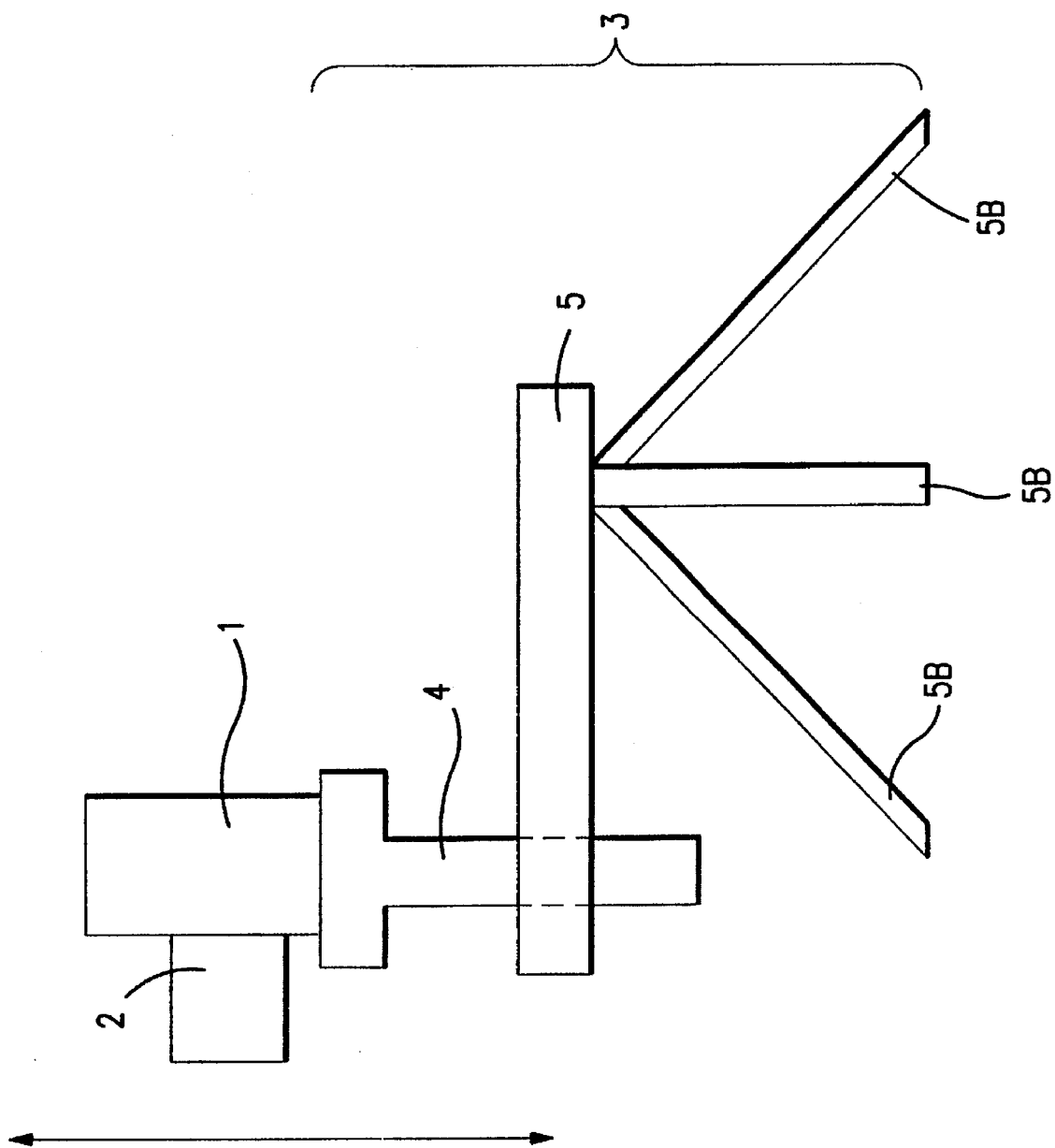

In the tripod head 3 shown in FIG. 1, the variable member 4 can rotate. Alternatively, FIG. 10 shows an example of a tripod head wherein the variable member 4 can move horizontally relative to the anchoring member 5; and FIG. 11 shows an example of a tripod head wherein the variable member 4 can move vertically relative to the anchoring member 5. Movement of the variable member when the posture lock is released may be conducted manually or automatically by a tripod head driving device 59 comprising an actuator, e.g., a motor or the like. If an ultrasonic motor is used as the tripod driving device 59, static friction is large when power is not supplied. Thus, it is possible to use this as the automatic posture lock device 58, also.

Figure 12:
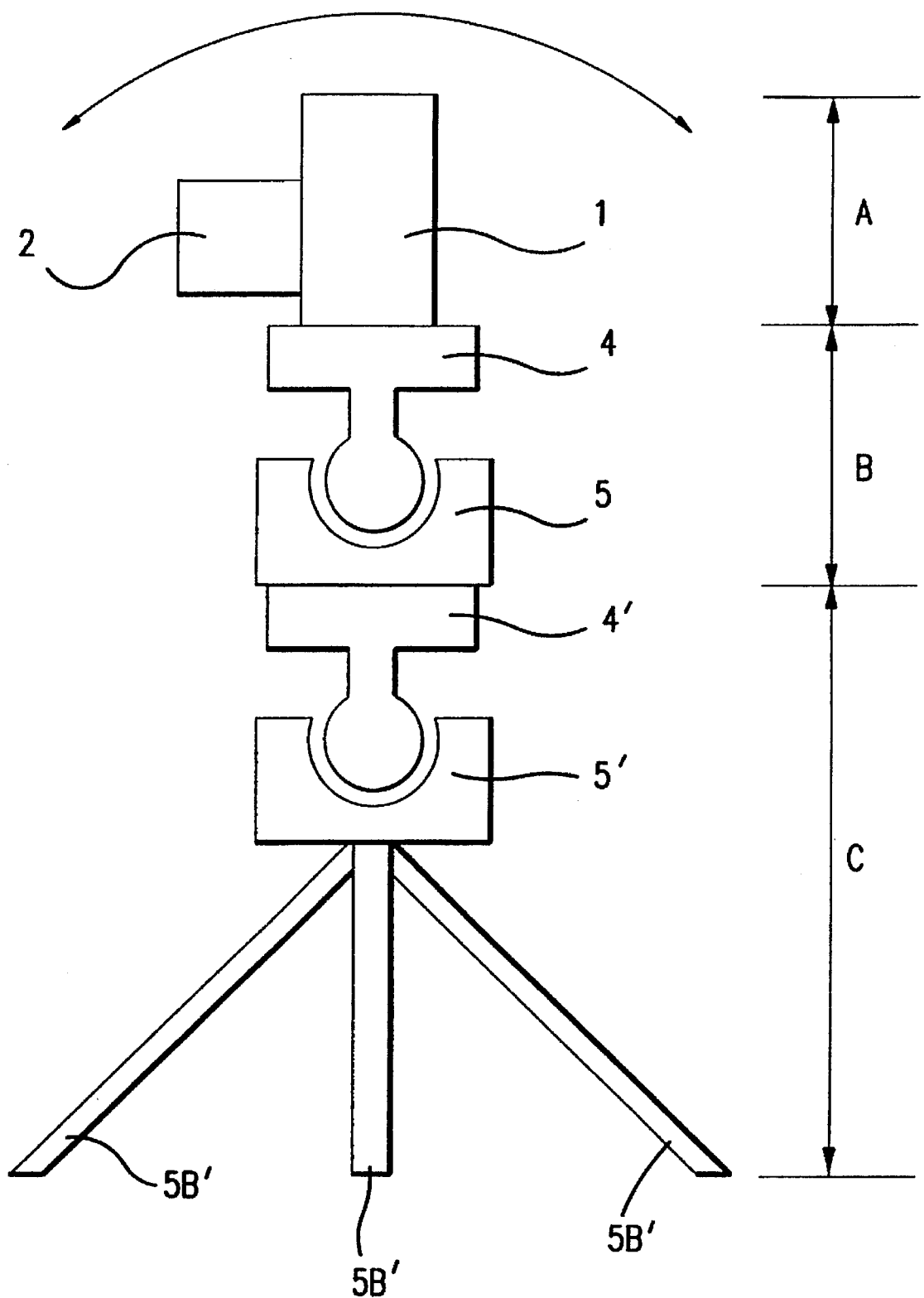

As shown in FIG. 12, it is alternatively possible for the automatic posture lock device 58 to be incorporated into an adaptor. In FIG. 12, the camera system A, composed of a camera body 1 onto which a lens 2 has been mounted, is attached to the adaptor system B, composed of a variable member 4 and an anchoring member 5, and control of the posture lock action of the automatic posture lock device 58 housed in the adaptor system B is possible from the camera system A. The anchoring member 5 of the adaptor system B is attached to variable member 4' of a tripod head system C provided with a manual posture lock device with which the variable member 4' can be locked or released relative to the anchoring member 5'. The tripod head system C is provided with legs 5B'. With this structure, it is possible to use a normal tripod head by adding only the adaptor portion.

Figure 13:
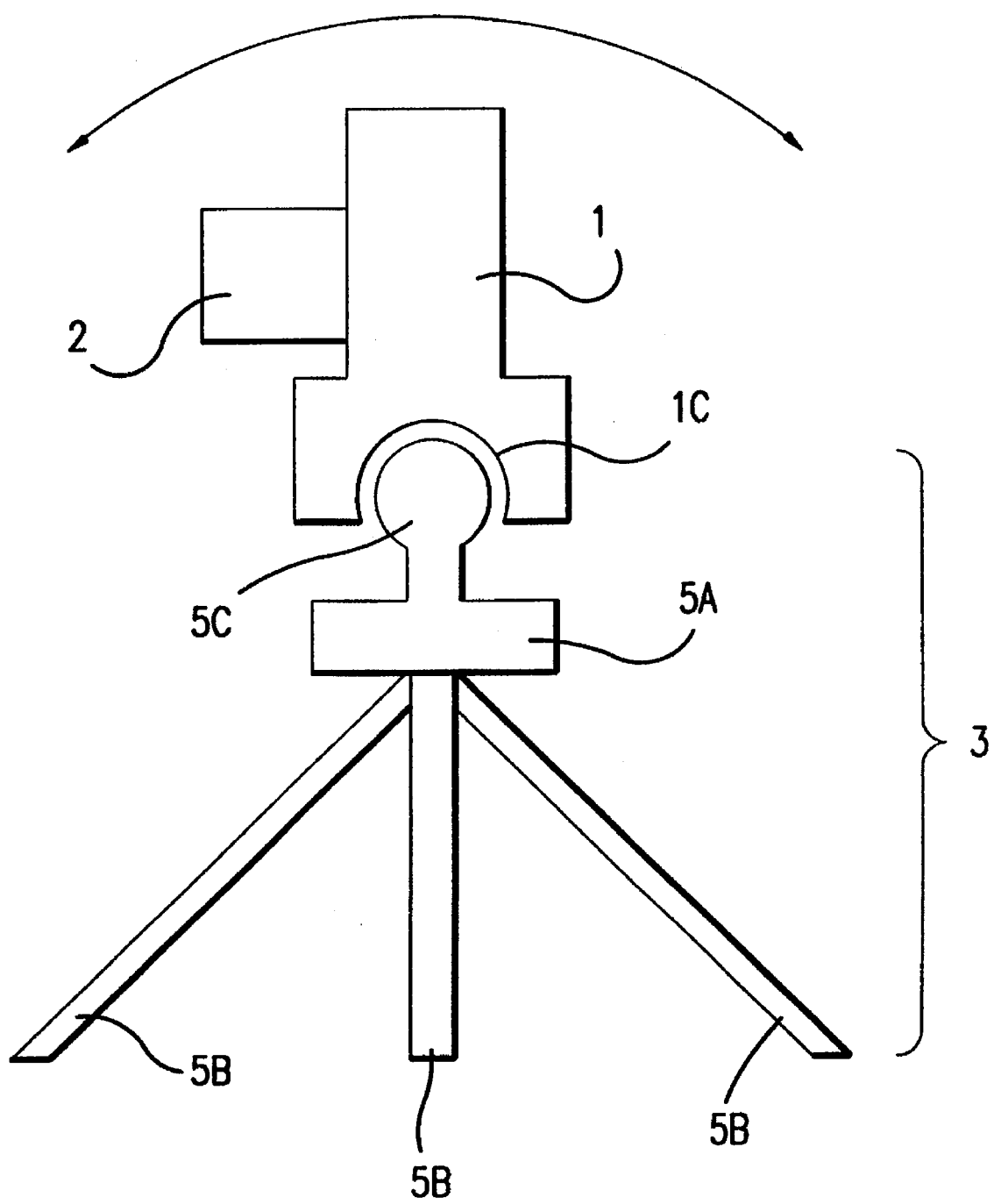

FIG. 13 shows an embodiment wherein the automatic posture lock device 58 is housed in the camera body 1. In FIG. 13, structural elements contained in the anchoring member 5A in the embodiment shown in FIG. 9 are alternatively housed in the camera body 1. There is no tripod screw hole 16 or connection terminal 18 in the bottom surface of the camera body 1. A concave-shaped engagement unit 1C is formed in the bottom of the camera in order to engage with the tripod head 3. In addition, the tripod head 3 is composed of legs 5B and an anchoring member 5A that has a ball-shaped engagement unit 5C that engages with the engagement unit 1C of the camera 1. The state of engagement between the engagement unit 1C of the camera body 1 and the engagement unit 5C of the tripod head 3 can be controlled by the automatic posture lock device 58 housed in the camera body 1 to any one of three stages: a posture lock state, a posture lock release state, and an engagement release state. With this kind of structure, the tripod head 3 is simplified and it is possible to automate mounting of the camera on the tripod head 3. In addition, connection terminals used to transmit signals between the camera body 1 and the tripod head 3 become unnecessary, making the system even more simple.

Figure 14:
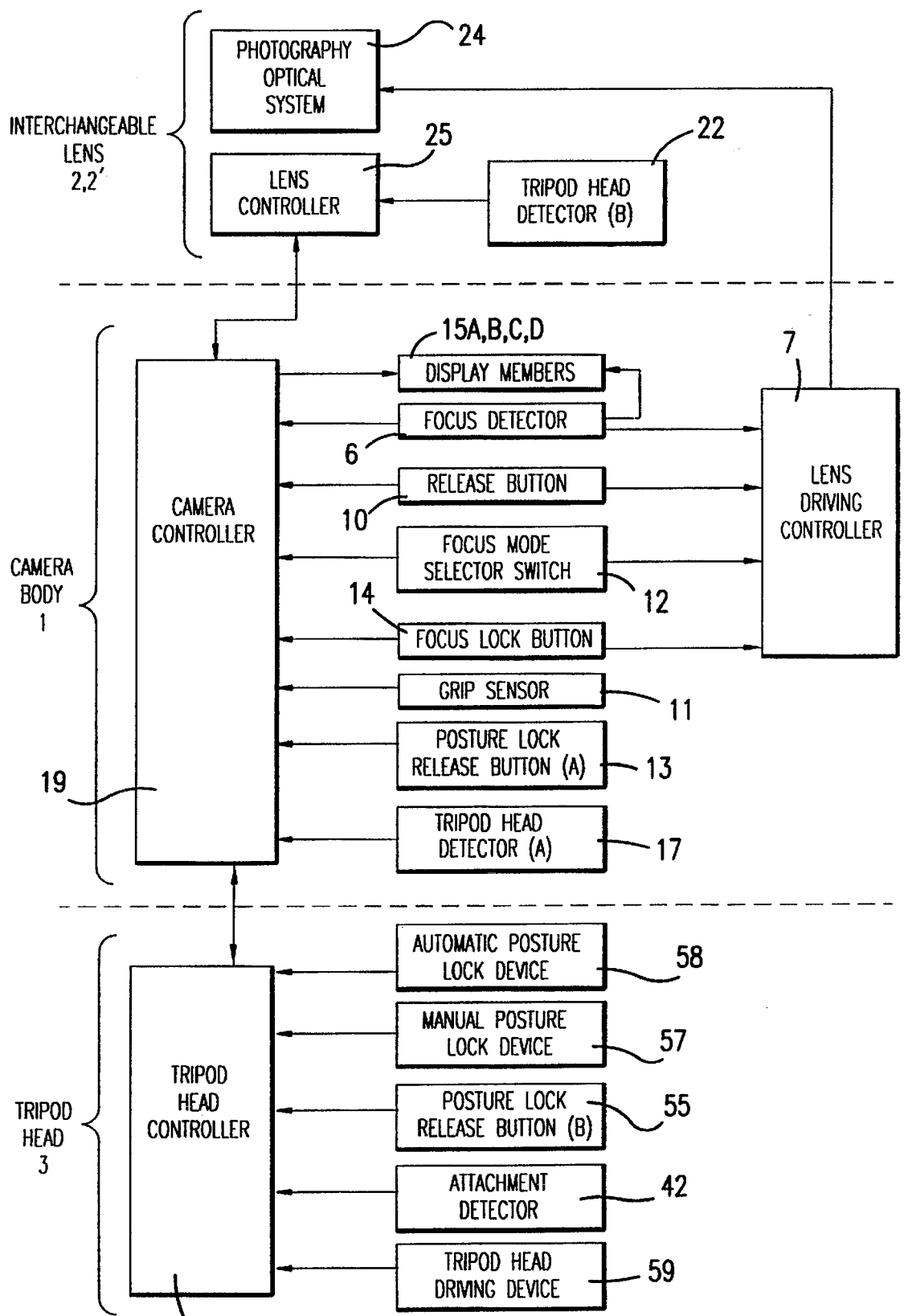
FIG. 14 is a block diagram showing, in combined fashion, two possible embodiments of an optical device system according to the invention.

FIG. 14 is a block diagram showing, in combined fashion, the system shown in FIG. 1 or FIG. 6. A photography optical system 24, tripod head detector 22, and lens controller 25 are housed in the lens 2' (FIG. 6 configuration). The lens controller 25 transmits detected information obtained from the tripod head detector 22 to the camera controller 19 housed in the camera body 1. The camera body 1 houses display members 15A, 15B, 15C, and 15D; focus detector 6; lens driving controller 7; shutter control release button 10; focus mode selector switch 12; focus lock button 14; grip sensor 11; posture lock release button 13; tripod head detector 17; and camera controller 19.

The focus detector 6 includes an image sensor and a focus detection algorithm circuit and detects focus adjustment information (defocus amount, focus, non-focus, focus detection impossibilities caused by low contrast in the subject, etc.) for the photography optical system 24. It does so by receiving light rays passing through the photography optical system 24, by means of an image sensor, and executing a focus detection algorithm based on the output signal from the image sensor. The focus detector 6 causes the display member 15A to display focus information in accordance with the focus detection information that it has obtained. The focus detector also sends focus adjustment information to the camera controller 19 and to the lens driving controller 7.

Information as to the operational state of the release button 10, the setting of the focus mode selector switch 12, and the operational state of the focus lock button 14 is sent to the camera controller 19 and to the lens driving controller 7. Information as to the detection state of the grip sensor 11, the operational state of the posture lock release button 13, and the detection state of the tripod head detector is sent to the camera controller 19.

The lens driving controller 7 includes an actuator with a computation circuit and a motor. The lens driving controller focuses the camera by computing the driving amount necessary to focus the photography optical system 24 based on focus adjustment information received from the focus detector 6. It then causes the photography optical system 24 to move by this driving amount by means of the actuator. The optical system is driven (or not driven) based on the operational state of the release button 10, the setting of the focus mode selector switch 12, and the operational state of the focus lock button 14. The focus detector 6 and the lens driving controller 7 together comprise the automatic focus adjustment apparatus.

Camera controller 19 obtains tripod head detection information from lens 2' (FIG. 6 configuration) via communication with the lens controller 25. Information as to the posture lock state of the tripod head 3 is obtained via communication with the tripod head controller 56. Tripod head control information is determined based on the operational state of the shutter release button 10; the setting of the focus mode selector switch 12; the operational state of the focus lock button 14; detection information from the grip sensor 11; the operational state of the posture lock release button A (13); and detection information from the tripod head detector A (17) or B (22). The tripod head control information is communicated to the tripod head controller 56.

Tripod head controller 56, automatic posture lock device 58, manual posture lock device 57, posture lock release button 55, attachment detector 42, and tripod head driving device 59 are housed in the tripod head 3. Camera controller 19 receives tripod head information as to the posture lock state of the manual posture lock device 57; the operational state of the posture lock release button 55; detection information from the attachment detector and driving state information from the tripod head driving device 59 via communication with the camera controller 19. The tripod head controller 56 controls the automatic posture lock device 58 based on tripod head control information sent by the camera controller 19 and the operational state of the posture lock release button 55.

The above elements are the principal structural elements of preferred embodiments of the present invention. Operation of the system will now be described in terms of these elements.

FIGS. 15–24 are flow charts detailing one manner of operation of an optical system according to the invention. They are based on the lens controller 25, camera controller 19, automatic focus adjustment apparatus, and tripod head controller 56 each being comprised of a microcomputer.

Figure 15A:
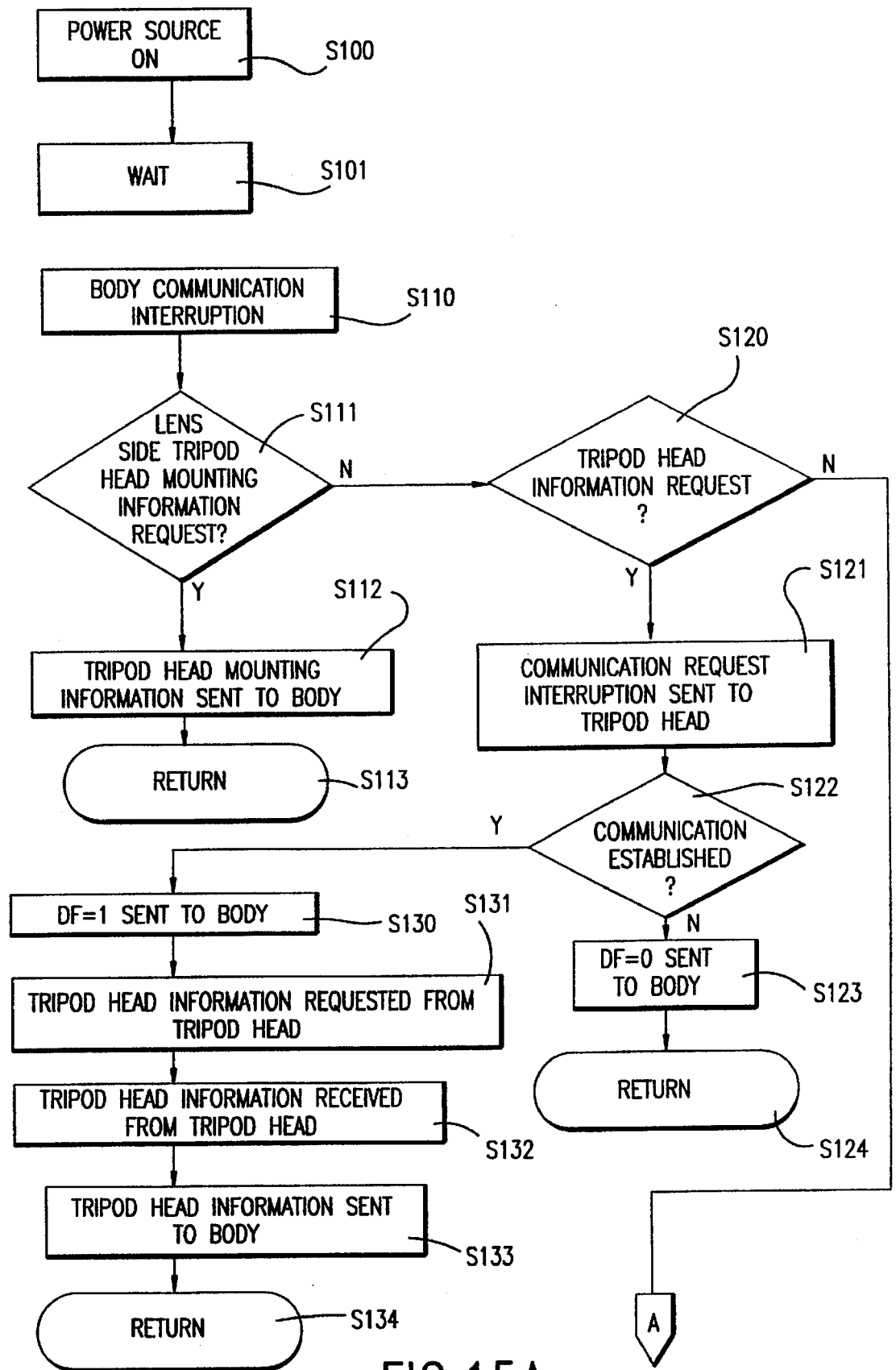
FIGS. 15A, 15B, 16, 17, 18A, 18B, 18C, and 19 flow charts showing the process of one embodiment of an optical device system according to the invention.
Figure 15B:
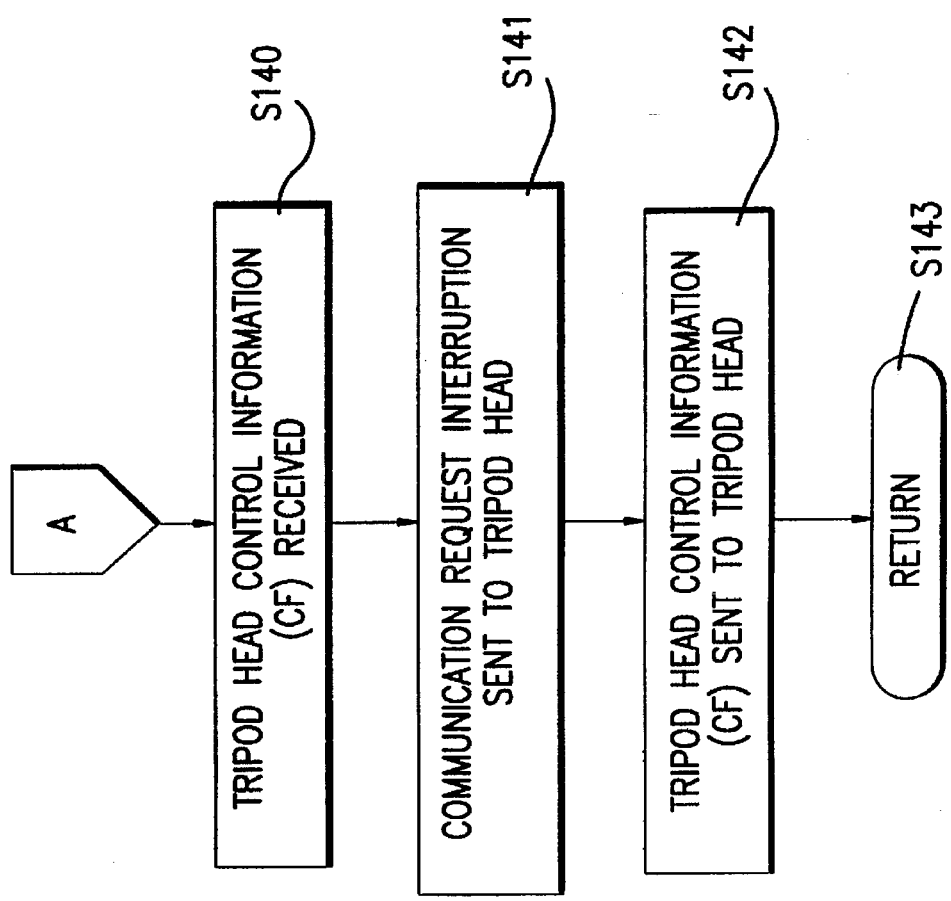

FIGS. 15A and 15B describe the actions of the lens controller 25. In step S100, the microcomputer is started when the power source is turned ON. In step S101, a waiting state begins.

In step S110, body communication is initiated by an interrupt request being sent from the camera body. In step S111, it is determined whether the request from the camera body 1 side is a request for lens side tripod head mounting information. If this is a request for lens side tripod head mounting information, tripod head mounting information is sent to the camera body 1 side based on the information received by the lens controller 25 from the tripod head detector 22. Control then returns to the microcomputer in step S113.

If the request from the camera body 1 side in step S111 is not a request for lens side tripod head mounting information, it is determined in step S120 whether the request from the camera body 1 side is a request for tripod head information. If this is a request for tripod head information, an interrupt request is sent to the tripod head 3 side in step S121. Then, in step S122, it is determined whether the interrupt request has been received by the tripod head 3 side and communication has been established. If communication has not been established, information as to the tripod head not being automatic posture locked (DF=0) is sent to the camera body in step S123. Control then returns to the microcomputer in step S124.

If communication is determined to be established in step S122, information corresponding to the tripod head being in automatic posture lock (DF=1) is sent to the camera body in step S130. In step S131, tripod head information (the state of the manual posture lock device 57; the operational state of the posture lock release button 55; detection information from the attachment detector 42; and driving state information from the tripod head driving device 59) is requested to be sent from the tripod head 3. In step S132, tripod head information is received from the tripod head 3, and in step S133, the tripod head information is sent to the body. Control then returns to the microcomputer in step S134.

If, in step S120, the interrupt request from the camera body 1 side is not a request for tripod head information, then the request from the camera body 1 side is a request to send tripod head control information to the tripod head 3. In that case, tripod head control information (CF) is sent from the camera body in step S140. A communication interrupt request is sent to the tripod head 3 in step S141, and tripod head control information (CF) is sent to the tripod head 3 in step S142. Control then returns to the microcomputer in step S143.

Figure 16:
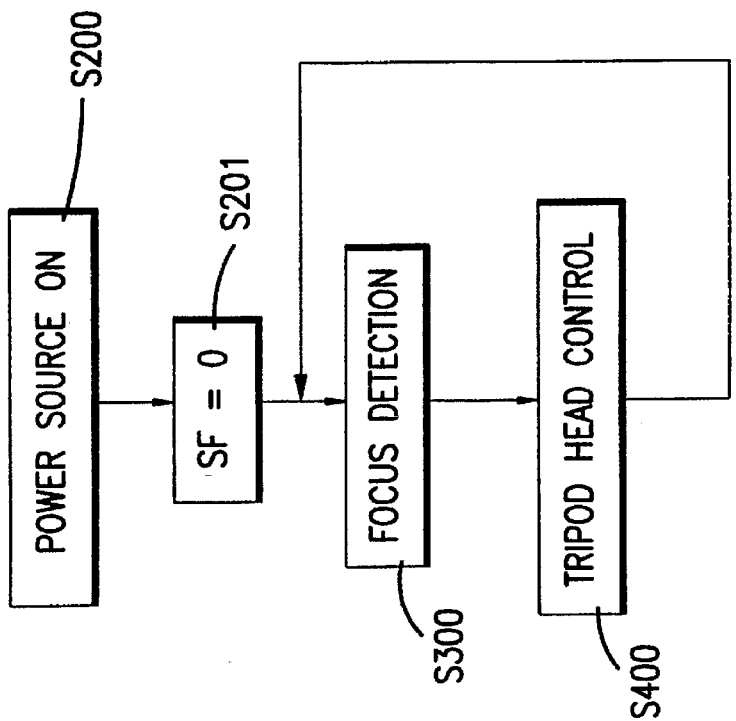

FIG. 16 is a flow chart detailing the actions of the camera controller 19. In step S200, the microcomputer is started when the power source is turned on. In step S201, one-shot focus lock information is cleared (SF=0). In step S300, the focus detection subroutine is called and executed. In step S400, the tripod head control subroutine is called and executed. The microcomputer then loops control back to step S300.

Figure 17:
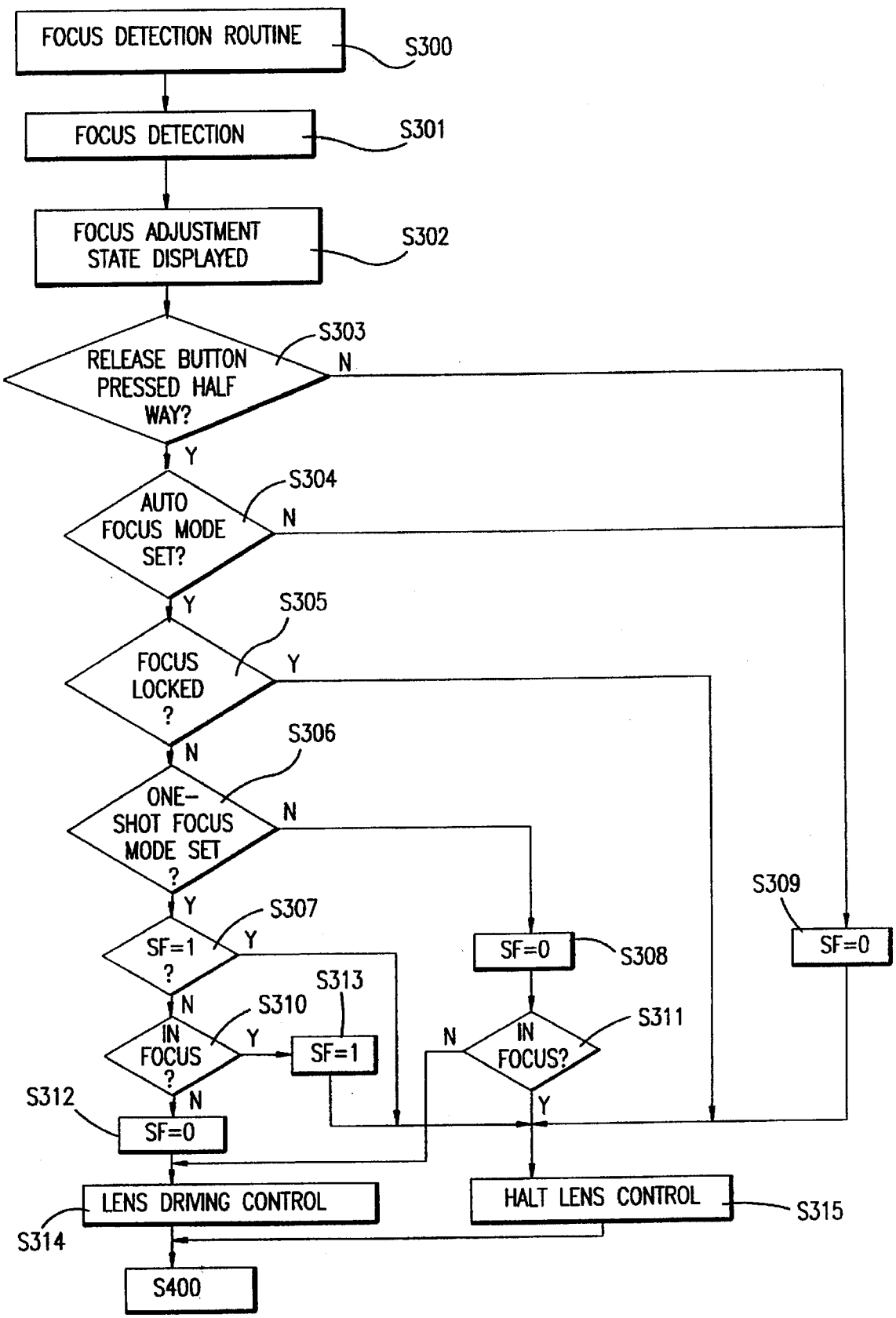

FIG. 17 describes the focus detection subroutine. The focus detection subroutine is started in step S300. In step S301, a focus detection algorithm is executed based on the output signal from the image sensor, and focus adjustment information (defocus amount, in focus/not in focus, detection impossible) is determined. In step S302, the focus adjustment state is displayed by display member 15A based on the focus adjustment information calculated by the detection algorithm.

In step S303, it is determined whether the shutter release button 10 is depressed half way. If the button is not depressed half way, the microcomputer moves to step S309, and a flag is set to 0 (SF=0).

In step S304, it is determined whether an automatic focus mode—one-shot or continuous—has been set by the focus mode selector switch 12. If not, the microcomputer moves to step S309, and SF is set to 0.

In step S305, it is determined whether the focus lock button 14 is being operated (focus in focus lock state) and, if so, the microcomputer moves to step S315 in which lens driving control is halted. In step S306, it is determined whether the one-shot focus mode has been set by the focus mode selector switch 12. If the one-shot focus mode has not been set (when the continuous focus mode has been set), the microcomputer moves to step S308 (SF=0). If the one-shot focus mode has been determined to be set in step S306, it is determined in step S307 whether a one-shot focus lock state (SF=1) exists. If so, the microcomputer moves to step S315 and lens control is halted.

When the one-shot focus lock state does not exist (SF=0) in step S307, a test is conducted in step S310 to determine whether the camera is properly focused based on the focus adjustment information. If it is, the microcomputer moves to step S313. If not, the one-shot focus lock state is cleared (SF=0), the driving amount necessary to bring the photography optical system 24 into focus is determined in step S314 based on the focus adjustment information (defocus amount), and the optical system 24 is driven based on this driving amount. Afterwards, the microcomputer moves to step S400.

In step S308, the one-shot focus lock state is cleared (SF=0). In step S311, it is determined whether the camera is in focus based on the focus adjustment information. If so, the microcomputer moves to step S315 and lens control is halted. In step S309, the one-shot mode focus lock state is cleared (SF=0). In step S313, the one-shot mode focus lock state is set (SF=1). In step S315, lens driving control is halted and the photography optical system 24 is locked. Afterwards, the microcomputer moves to step S400.

Thus, through the above-described sequence, auto focussing when the release button 10 is depressed half way is conducted. If in the continuous focus mode, lens driving is prevented by the focus lock operation; if in the one-shot focus mode, lens driving is prevented once proper focus has been achieved; and if in the manual focus mode, lens driving is prevented altogether.

Figure 18A:
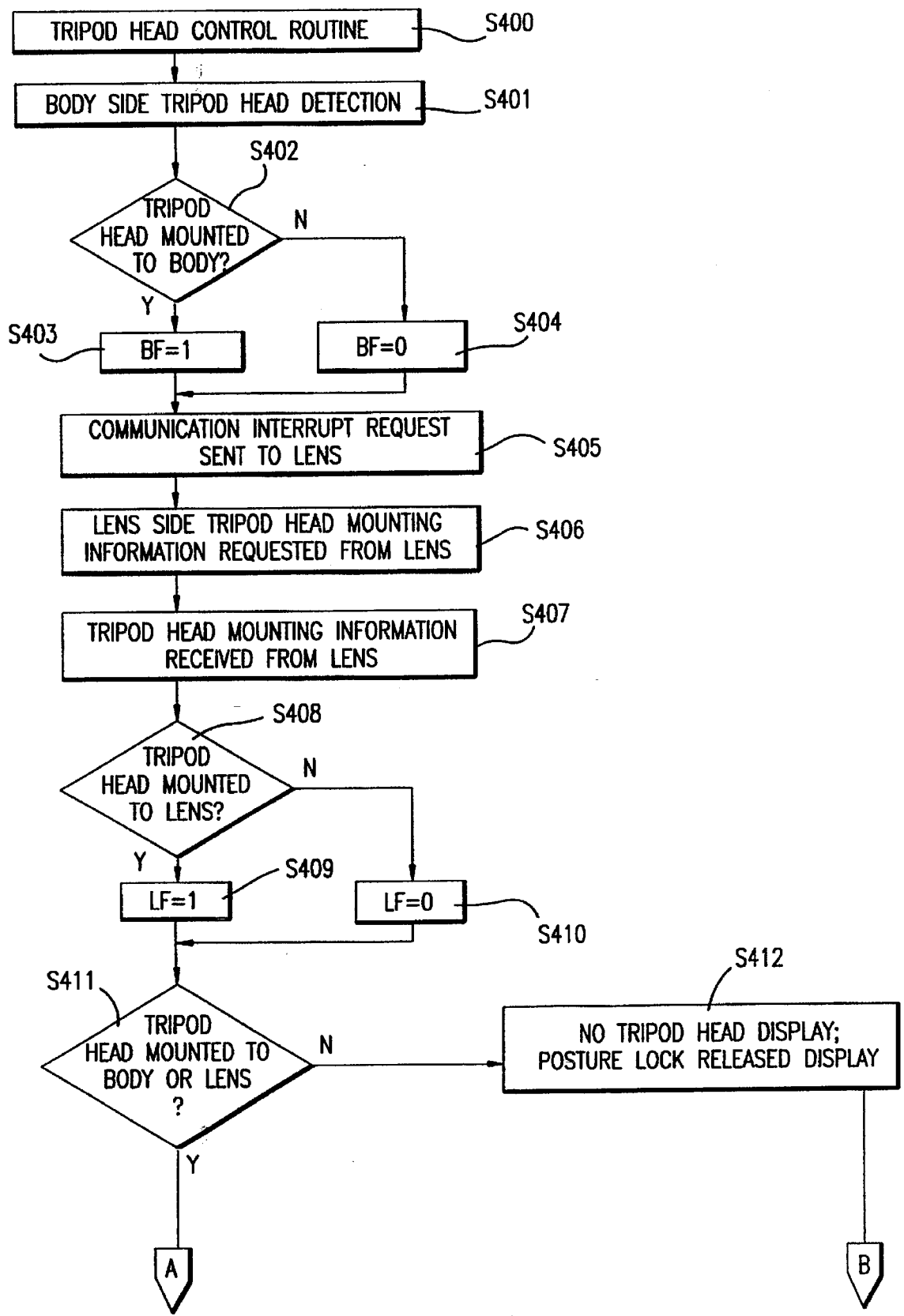
Figure 18B:
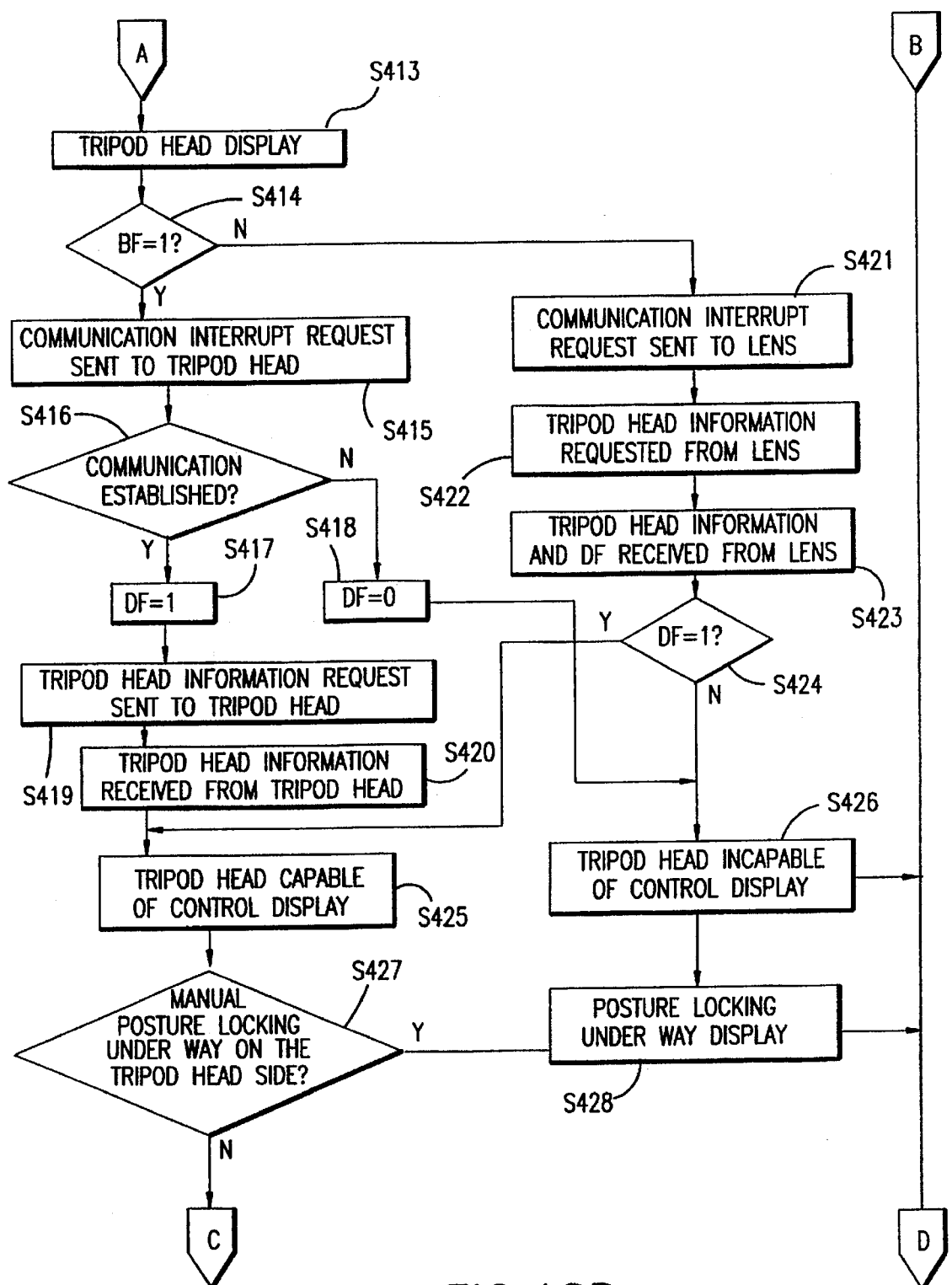
Figure 18C:
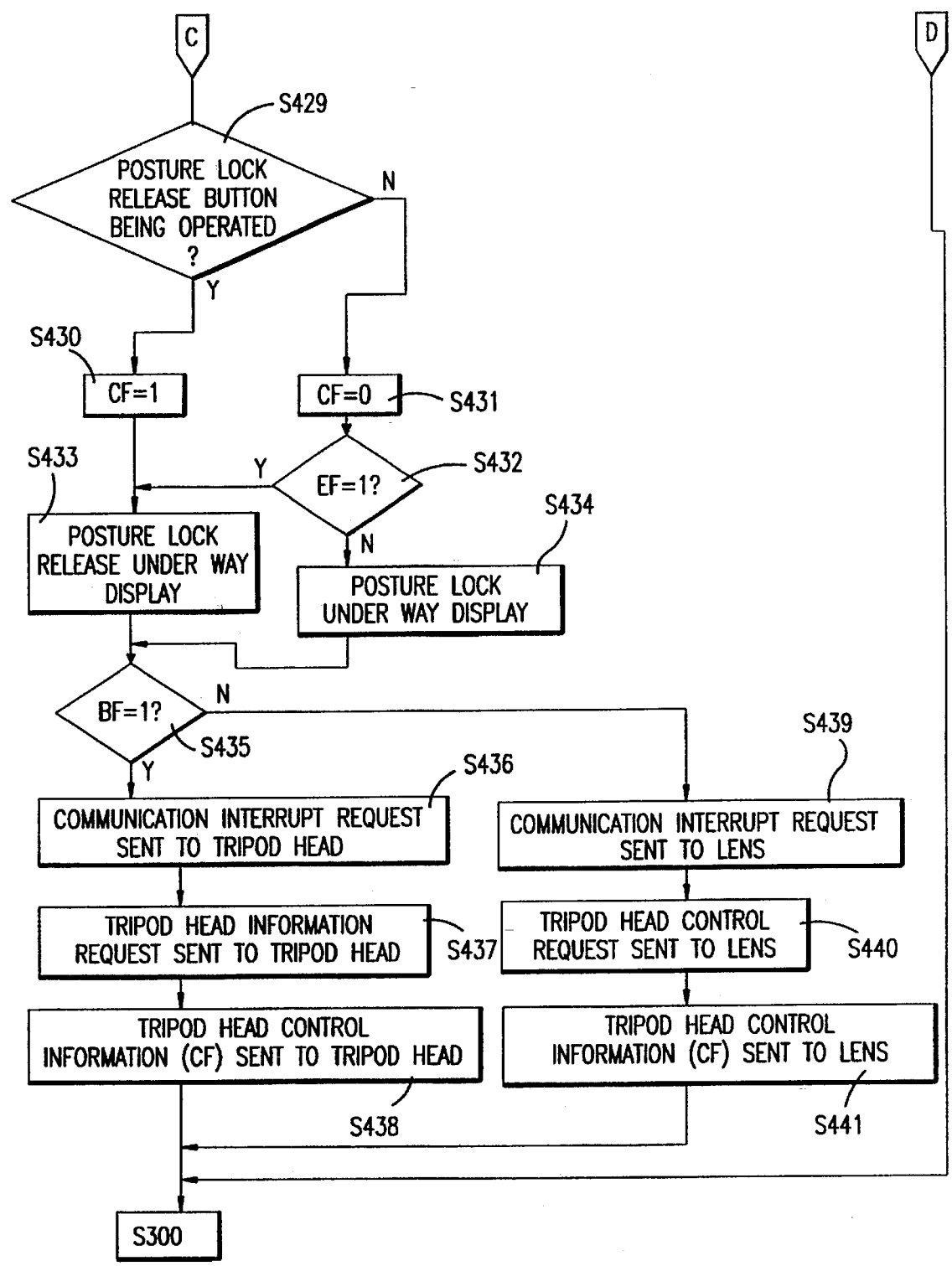

FIGS. 18A–18C show a flow chart detailing the tripod head control subroutine. The tripod head control subroutine is started from step S400. In step S401, the tripod head detection information is read from the tripod head detector 17.

In step S402, it is determined, based on the tripod head detection information, whether the tripod head 3 is mounted to the body. If the tripod head 3 is mounted to the body, the body-tripod head mounting information is set (BF=1) in step S403; if the tripod head is not mounted to the body, the body-tripod head mounting information is cleared (BF=0) in step S404.

In step S405, a communication interrupt request is sent to the lens. In step S406, a request for lens side tripod head mounting information is sent to the lens. In step S407, the lens side tripod head mounting information is received from the lens.

In step S408, it is determined, on the basis of the tripod head detection information, whether the tripod head 3 is mounted to the lens. If the tripod head 3 is mounted to the lens, the lens-tripod head mounting information is set (LF=1) in step S409; if the tripod head is not mounted to the lens, the lens-tripod head mounting information is cleared (LF=0) in step S410.

In step S411, it is determined, on the basis of the body-tripod head mounting information (BF) and the lens-tripod head mounting information (LF), whether the tripod head 3 is mounted to the body or the lens. If the tripod head is not mounted to either the body or the lens, that fact is indicated by turning OFF the display member 15C in step S412, and the fact that the posture is in a released state is displayed by turning OFF the display member 15B. Additionally, because the tripod head 3 has not been mounted, the fact that the tripod head will not handle automatic posture locking is indicated by turning OFF the display member 15D. The microcomputer then returns control to step S300. If, on the other hand, the tripod head 3 has been determined to be mounted to the body or the lens in step S411, that fact is indicated in step S413 by turning on the display member 15C.

In step S414, it is determined, based on the body-tripod head mounting information (BF), whether the tripod head 3 is mounted to the body. If the tripod head has not been mounted to the body, the microcomputer moves to step S421, which is addressed below. If the tripod head has been mounted to the body, a communication interrupt request is sent to the tripod head 3 in step S415. It is determined in step S416 whether the communication interrupt request has been received by the tripod head 3 and whether communication has been established. If communication is not established, information indicating that the tripod head does not handle automatic posture locking is cleared (DF=0) in step S418. The microcomputer then moves control to step S426, addressed below.

If communication is determined to be established in step S416, information indicating that the tripod head handles automatic posture locking is set (DF=1) in step S417. In step S419, tripod head information (posture lock state of the manual posture lock device 57; operational state of the posture lock release button 55; detection information from the attachment detector 42, and driving state information from the tripod head driving device 59) is requested from the tripod head 3. In step S420, the tripod head information is received from the tripod head 3, and the microcomputer then moves to step S425 in which the fact that the tripod head is capable of being controlled is displayed.

If it is determined in step S414 that the body is not mounted to the tripod head 3, a communication interrupt request is sent to the lens in step S421. In step S422, a request for tripod head information is sent to the lens. In step S423, the tripod head information and DF value are received through the lens.

In step S424, it is determined whether the tripod head 3 which has been mounted to the lens side can handle automatic posture locking. If not, the display member 15B is turned OFF in step S426 so that the fact that posture is not locked is indicated. Indication that the tripod head cannot handle automatic posture locking is also effected by turning OFF the display member 15D. The microcomputer then returns control to step S300. If, on the other hand, the tripod head 3 which has been mounted to the body or the lens can handle automatic posture locking, indication of that fact is achieved by turning the display member 15D ON in step S425.

In step S427, a test is conducted, on the basis of the tripod head information, as to whether the tripod head 3 is being manually locked. If so, the fact that the posture is being locked is displayed by turning ON the display member 15B in step S428, after which the microcomputer returns to step S300.

If the posture is not being manually locked in step S427, the operational state of the posture lock release button 13 is determined in step S429. If this button is not being depressed, the tripod head control information is cleared (CF=0) in step S431, and a test is conducted in step S432, on the basis of the tripod head information, to determine the operational state of the posture lock release button 55 on the tripod head 3 side. If this button 55 is not being depressed, the fact that the posture is being locked is indicated by turning ON the display member 15B in step S434, and the microcomputer then moves to step S435. If, on the other hand, the posture lock release button 13 is being depressed in step S429, the tripod head control information is set (CF=1) in step S430 and the fact that the posture is unlocked is indicated by turning OFF the display member 15B in step S433. The microcomputer then moves to step S435.

In step S435, it is determined, on the basis of the body-tripod head mounting information (BF), whether the tripod head 3 is mounted to the body. If not, the microcomputer moves to step S439, addressed below. If the tripod head is mounted to the body, a communication interrupt request is sent to the tripod head 3 in step S436. In step S437, a request for tripod head information is sent to the tripod head 3. In step S438, tripod head control information (CF) is sent to the tripod head 3, and the microcomputer then returns to step S300. If, on the other hand, the tripod is determined not to be mounted to the body in step S439, a communication interrupt request is sent to the lens. In step S440, a request for tripod head control is sent to the lens. In step S441, the tripod head control information (CF) is sent to the lens, and the microcomputer then returns to step S300.

Figure 19:
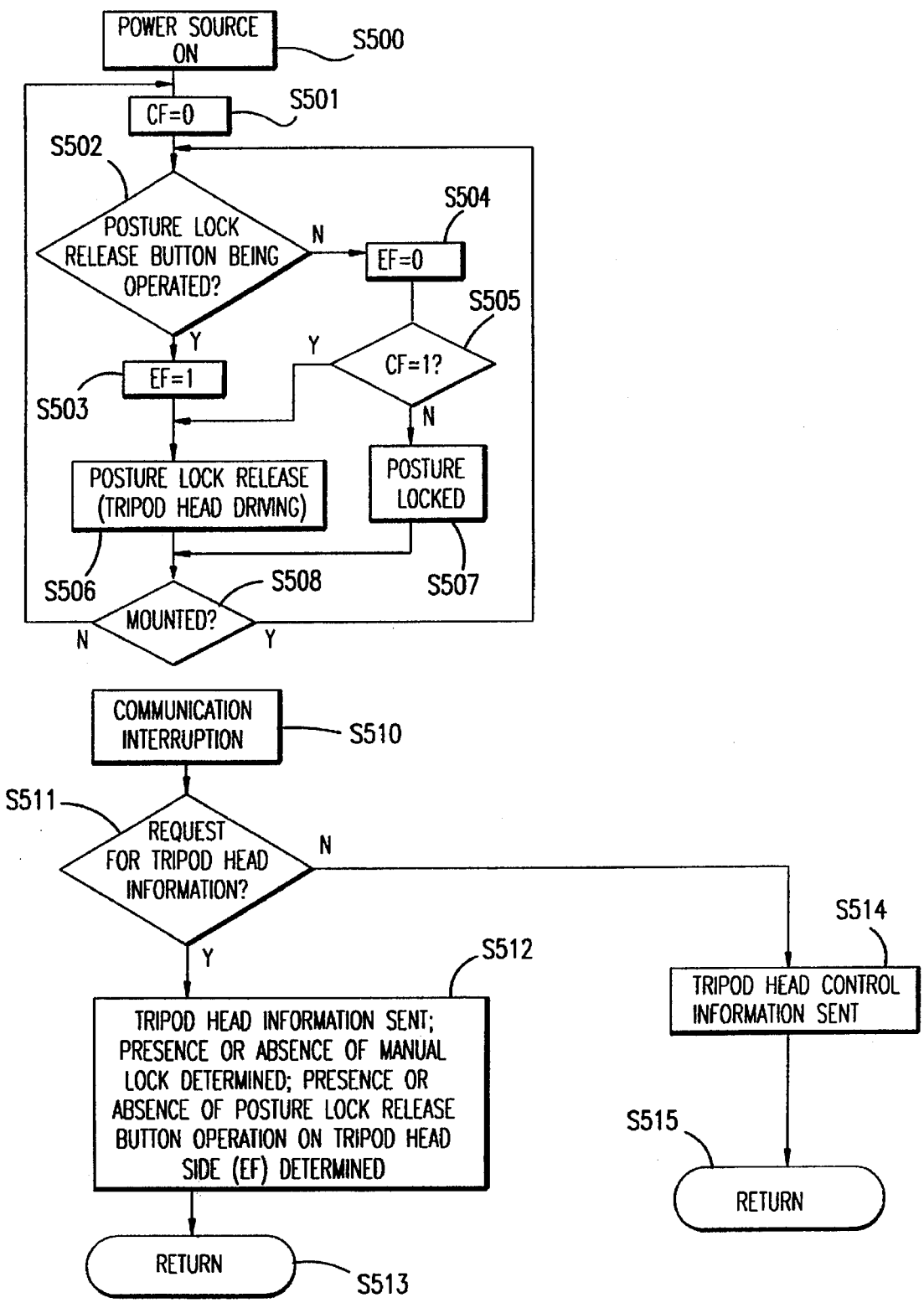

FIG. 19 is a flowchart detailing the actions of the tripod head controller 56. In step S500, the microcomputer is started when the power source is turned ON. In step S501, the tripod head control information from the body is cleared (CF=0). In step S502, the operational state of the posture lock release button 55 is determined. If this button is not being depressed, the tripod head information is cleared (EF=0) in step S504. It is then determined in step S505, on the basis of the tripod head control information (CF), whether the tripod head control request (CF) from the camera body 1 side is a posture lock or a lock release request. If this request is a posture lock release request, the microcomputer moves to step S506; if this request is a posture lock request, the automatic posture lock device 58 is controlled in step S507 to lock the posture. The microcomputer then moves to step S508.

On the other hand, if the posture lock release button 55 is being depressed in step S502, the tripod head information is set (EF=1) in step S503, the automatic posture lock device 58 is activated to release the posture lock in step S506; and the microcomputer then moves to step S508. (In step S507, if the tripod head 3 has a tripod head driving device 59, the tripod head driving device 59 is controlled in accordance with the operational state of a tripod head operation member, not shown.)

In step S508, the attachment detector 17 or 22 determines whether the tripod head 3 is mounted on the lens or the body. If the tripod head is mounted, the microcomputer returns to step S502; if the tripod head is not mounted, the microcomputer returns to step S501.

In step S510, a communication interrupt request is sent by the camera body or the lens. In step S511, it is determined whether the request is a request for tripod head information. If so, the tripod head information (the posture lock state of the manual posture lock device the operational state of the posture lock release button 55; detection information from the attachment detector and driving state information from the tripod head driving device 59) is sent to the communication receiver in step S512, and the microcomputer then returns in step SS13. If the request in step S511 is not a request for tripod head information, tripod head control information is sent in step S514, and control returns to the microcomputer in step S515.

Thus, it is possible to control the automatic posture lock device 58 provided on the tripod head 3 side by operating the posture lock release button 13 provided on the camera body 1 side.

In steps S429 through S432 in FIG. 18C, locking of the automatic posture lock device 58 provided on the tripod head 3 side is released when the posture lock release button 55 provided on the tripod head 3 side or the posture lock release button 13 provided on the camera body 1 side is depressed. It is also possible to release the posture lock device through control operations on the lens 2' side by shifting functions similar to those of the posture lock release button 13 to the operation member 26 on the lens 2'. This makes it easier to use a telephoto lens with a tripod head 3. In other words, although it is always necessary to hold a telephoto lens because it is heavy, it is extremely convenient to be able to release the posture lock, when changing setup, while still holding the lens.

Additionally, in steps S429 through S432 in FIG. 18C, posture lock releasing is effected by an operational member (e.g., a button) that is exclusively a posture lock release button. It would also be acceptable to release the posture lock in accordance with the operation of some other operational member or in accordance with the automatic focus adjustment apparatus.

Figure 20:
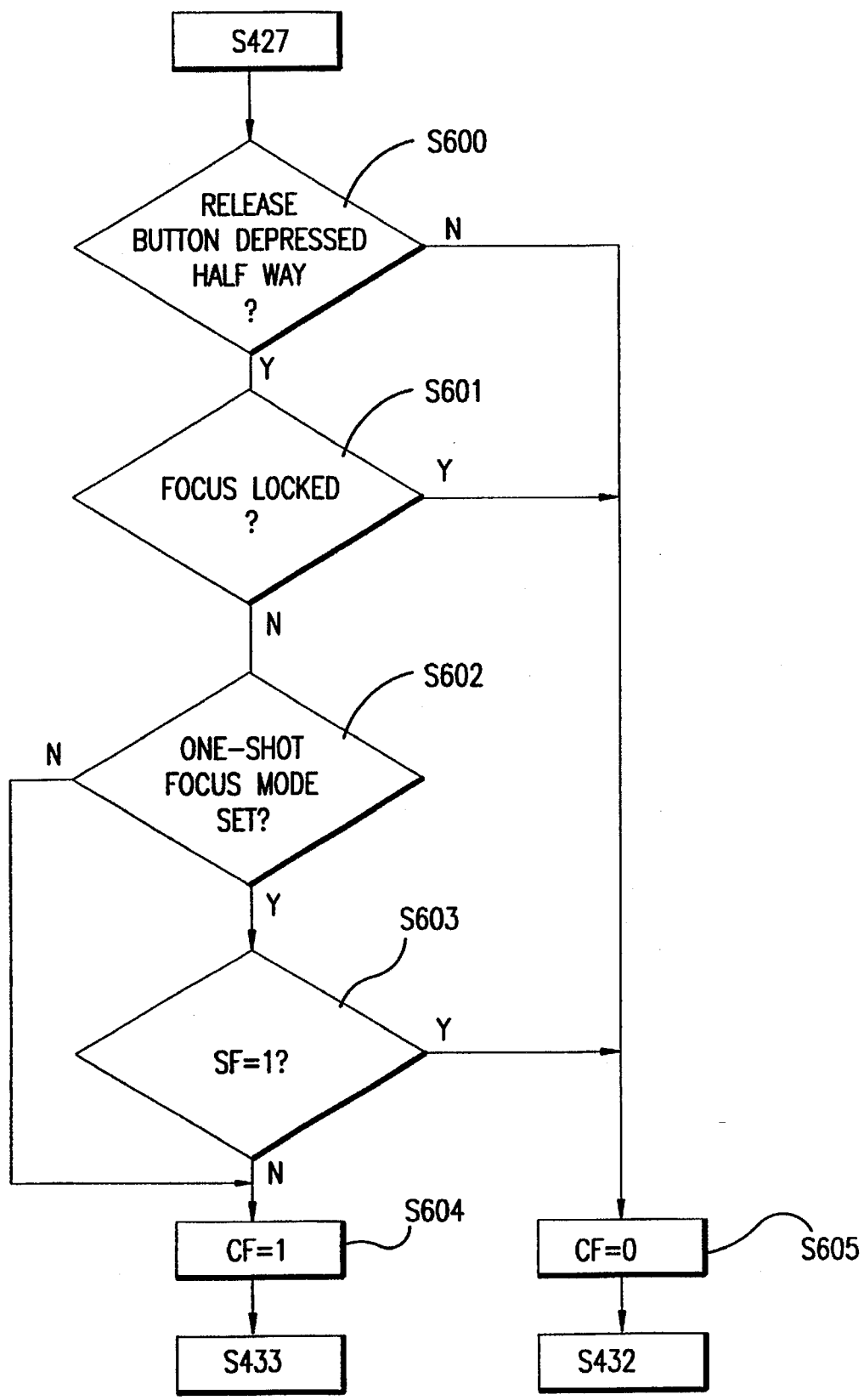
FIGS. 20, 21, 22, 23, and 24 are flow charts showing processes for other embodiments of an optical device system according to the invention.

For example, FIG. 20 details the sequence when the posture lock is released in accordance with the operation of the release button 10 and the adjustment state of an automatic focus apparatus. This flowchart would replace steps S429 through S432 in FIG. 18C.

In step S600, it is determined whether the release button 10 is depressed half way. If not, the microcomputer moves to step S605.

If the button is depressed half way, it is determined in step S601 if the focus lock button 14 is being operated. If so, the microcomputer moves to step S605. If the focus lock button is not being operated, it is determined in step S602 whether the focus mode selector switch 12 has been set to the one-shot focus mode. If the one-shot focus mode has not been set, the microcomputer moves to step S604.

If the one-shot focus mode has been set in step S602, it is determined in step S603 whether the camera is in a one-shot focus lock state. If not, the tripod head control information is set (CF=1) in step S604, and the microcomputer then moves to step S433. If so, on the other hand, the tripod head control information is cleared (CF=0) in step S605, and the microcomputer moves to step S432.

With this sequence, the automatic focus adjustment apparatus is set to the one-shot focus mode, and if the release button 10 is depressed half way, the focus lock prior to the one-shot focus lock state is released. If the focus mode is set to the one-shot focus mode and the release button 10 is depressed half way, the posture lock is released until the focus is locked so that the setup can be changed freely. Once focus on the subject has been attained, the one-shot focus lock state is set. Thus, posture lock (setup lock) can be conducted simultaneously with the lens driving being locked.

This sequence eliminates the need for an exclusive posture lock release button, and ease of use is improved since it is possible to lock simultaneously the focus and the setup. The photographer can release the posture lock by again depressing the release button 10 half way.

When focussing is conducted by again depressing the button half way, there is not extra time to change the setup by releasing the posture lock. It is possible to avoid this problem by designing the system so that the one-shot focus lock state is not set for a predetermined length of time after the button is again depressed half way.

Figure 21:
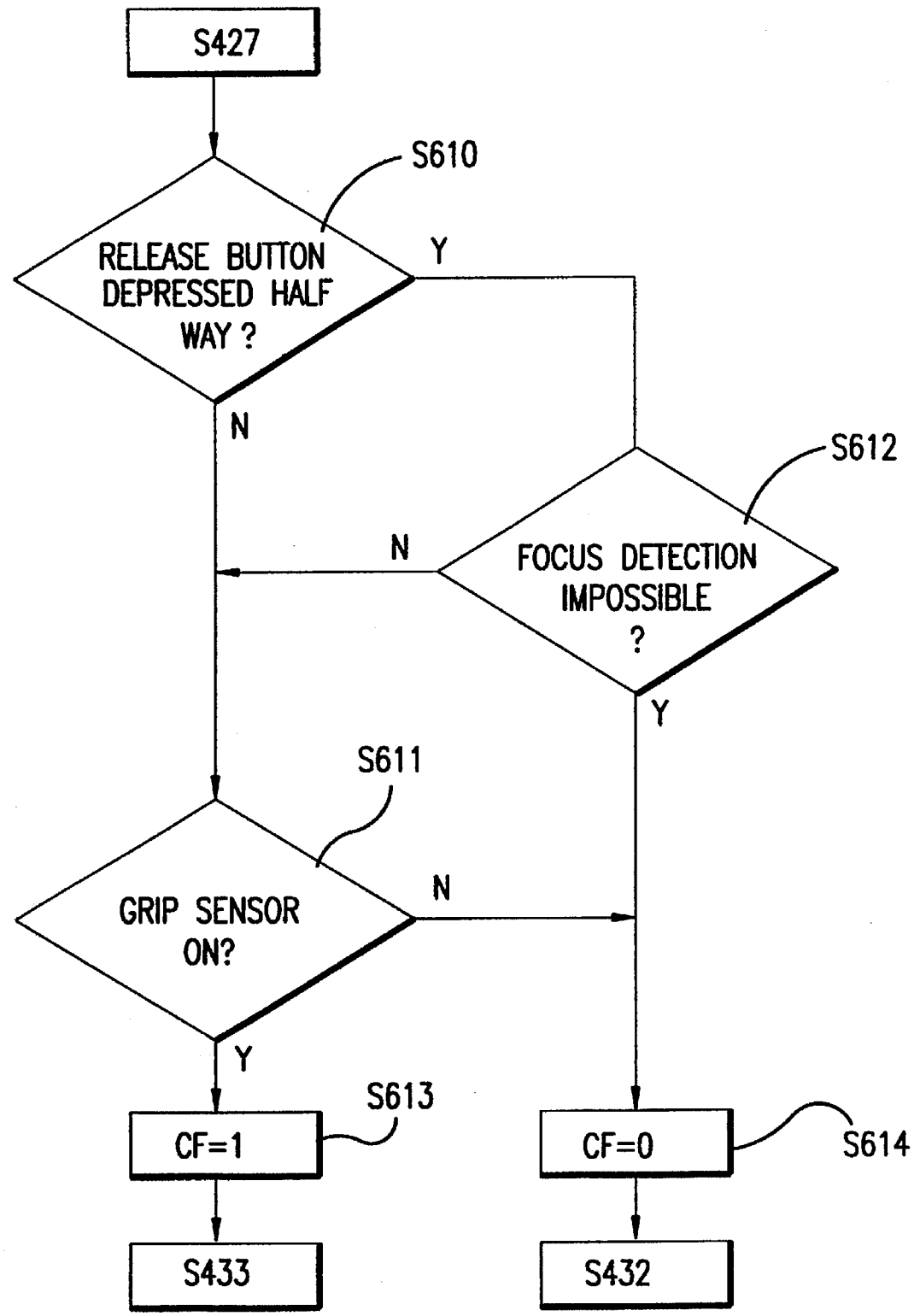

FIG. 21 shows the sequence when the posture lock is released in accordance with the operation of the release button 10, the focus adjustment state of the automatic focus adjustment apparatus, and the detection information from the grip sensor. This flowchart replaces steps S429 through S432 in the flowchart in FIG. 18C.

In step S610, it is determined whether the release button 10 is depressed half way. If not, the microcomputer moves to step S611. In step S611, it is determined based on the detection information from the grip sensor 11 whether the photographer is gripping the camera body 1. If so, the microcomputer moves to step S613. If the camera is not being gripped in step S611, the microcomputer moves to step S614.

If, in step S610, the release button 10 is depressed half way, it is determined in step S612 whether focus detection is impossible. If focus detection is impossible, the microcomputer moves to step S611, whereas if focus detection is not impossible, the microcomputer moves to step S614. In step S613, the tripod head control information is set (CF=1), and the microcomputer then moves to step S433. Alternatively, in step S614, the tripod head control information is cleared (CF=0), and the microcomputer then moves to step S432.

With this sequence, the posture lock is released when the shutter release button 10 is released and the photographer is gripping the camera body 1 so that changing the setup is possible. When the release button 10 is depressed half way and the photographer begins to take a picture, the posture is locked and the setup is fixed. In addition, even when the release button 10 is depressed half way, when focus detection is impossible, the posture lock is released if the camera body 1 is being gripped. In this manner, it is possible to release the posture lock only when the camera body is held steadily by the photographer. Because the posture is locked when photography preparation begins, shaking the camera does not influence the photograph.

In addition, it is possible to design the system so that, while the release button 10 is depressed half way, the posture is not locked until the defocus amount is within a predetermined value near the in-focus state. In this manner, it is possible to lock the setup only after the image has been focused with a predetermined level of accuracy.

Figure 22:
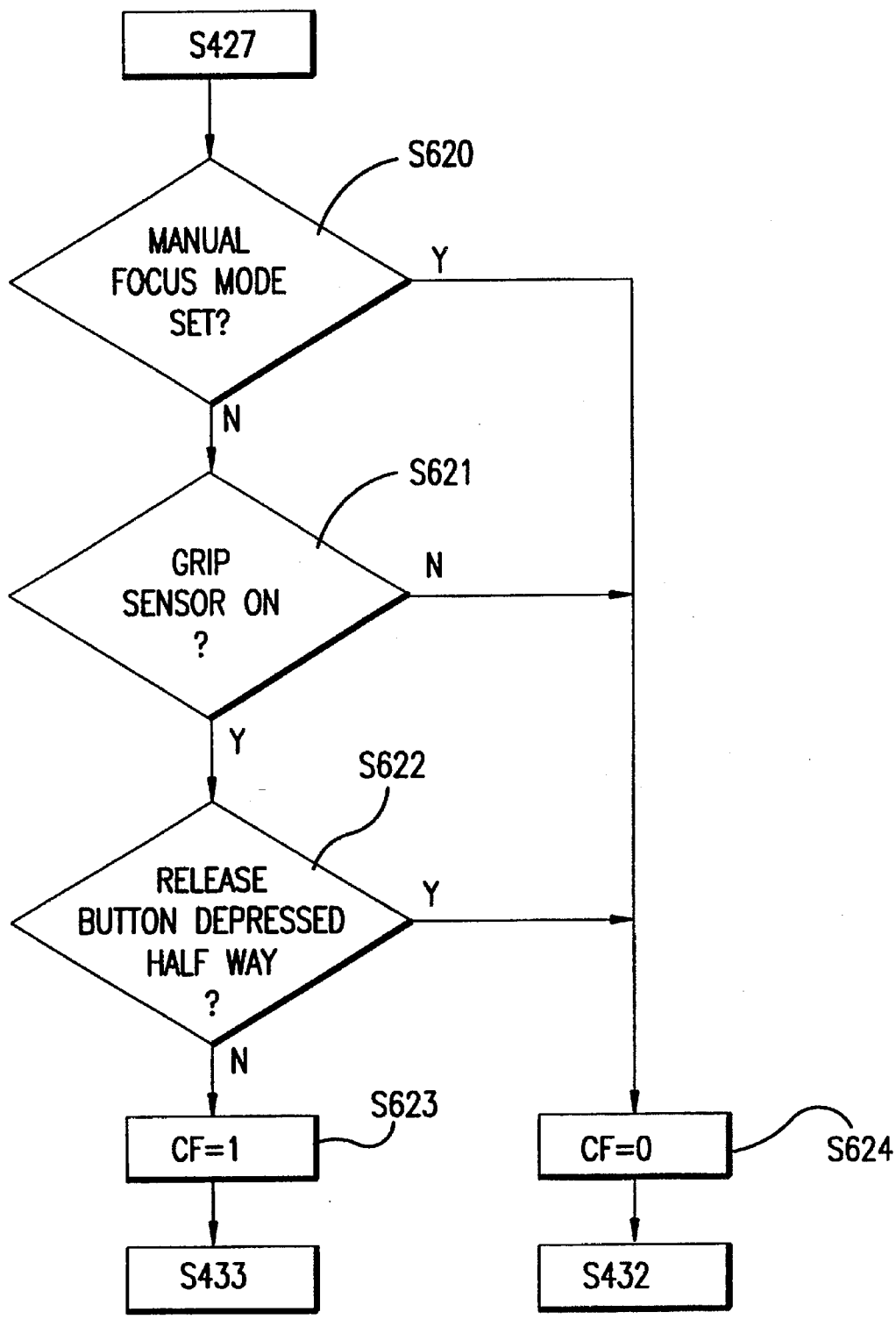

FIG. 22 is a flowchart showing the sequence when the posture lock is released in accordance with the operation of the release button 10, the focus adjustment state of the automatic focus apparatus, and the detection information from the grip sensor 11. This flowchart would replace steps S429 through S432 in FIG. 18C.

In step S620, it is determined whether the focus mode selector switch 12 has been set to the manual focus mode. If so, the microcomputer moves to step S614.

In step S621, it is determined, based on detection information from the grip sensor 11, whether the photographer is gripping the camera body 1. If the camera is not being gripped, the microcomputer moves to step S624. In step S622, it is determined whether the release button 10 is depressed half way. If not, the microcomputer moves to step S623. If the button is depressed half way, the microcomputer moves to step S624. In step S623, the tripod head control information is set (CF=1), and the microcomputer then moves to step S433. On the other hand, in step S624, the tripod head control information is cleared (CF=0), and the microcomputer then moves to S432.

With this sequence, the posture will be locked unconditionally when the camera has been set to the manual focus mode. Accordingly, when the photographer wishes to change the setup, the posture lock must be released by operating the manual posture lock device 57 provided on the tripod head 3. In addition, the posture lock can be released only if the camera body 1 is gripped by the photographer. Moreover, when the picture is taken by the release button 10 being depressed completely, the posture is forcibly locked to keep the camera from shaking. Furthermore, it is possible to release the posture lock only when the camera body 1 is being held steadily by the photographer. Since the posture is locked when the picture-taking is initiated, the image is not affected by camera shake.

Figure 23:
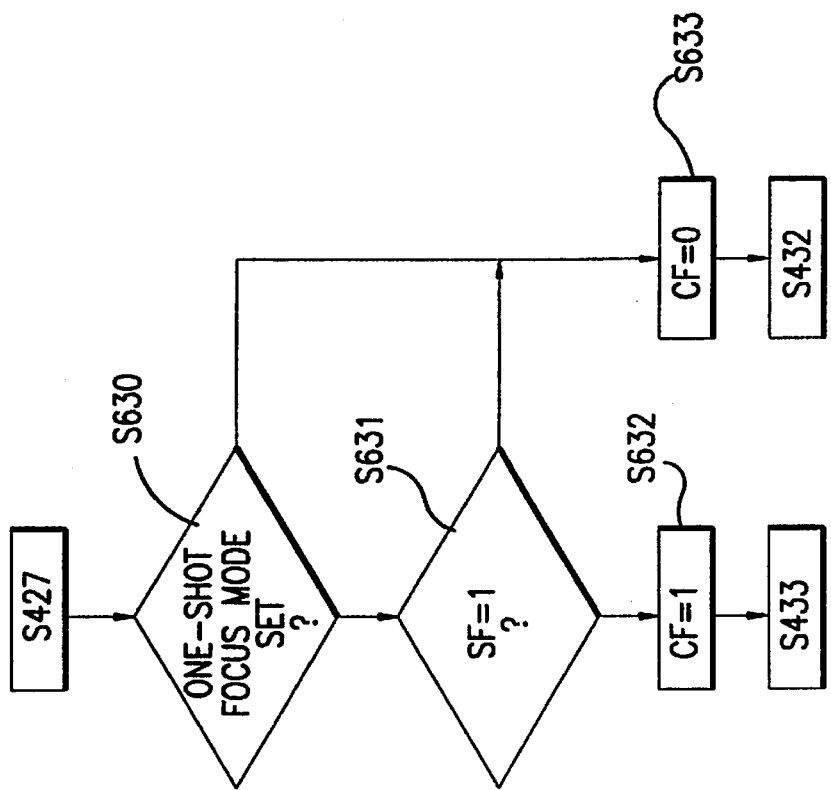

FIG. 23 is a flowchart detailing the sequence when the posture lock is released in accordance with the focus adjustment state of the automatic focus adjustment apparatus. This flowchart would replace steps S429 through S432 in FIG. 18C.

In step S630, it is determined whether the focus mode selector switch 12 has been set to the one-shot focus mode. If the one-shot focus mode has not been set, the microcomputer moves to step S633. If the one-shot focus mode has been set in step S630, it is determined in step S631 whether there is a one-shot focus lock state and, if there is a one-shot focus lock state, the tripod head control information is set (CF=1) in step S604. The microcomputer then moves to step S433. When there is not a one-shot focus lock state in step S631, the tripod head control information is cleared (CF=0) in step S633, and the microcomputer then moves to step S432.

With this sequence, the posture lock is released only after a one-shot focus lock state has been achieved when the camera is in the one-shot focus mode and the release button 10 has been depressed half way. This eliminates the need to provide an exclusive posture lock release button and makes it possible to adjust the position of the subject in the picture plane when changing the camera setup after the camera has been focused.

Figure 24:
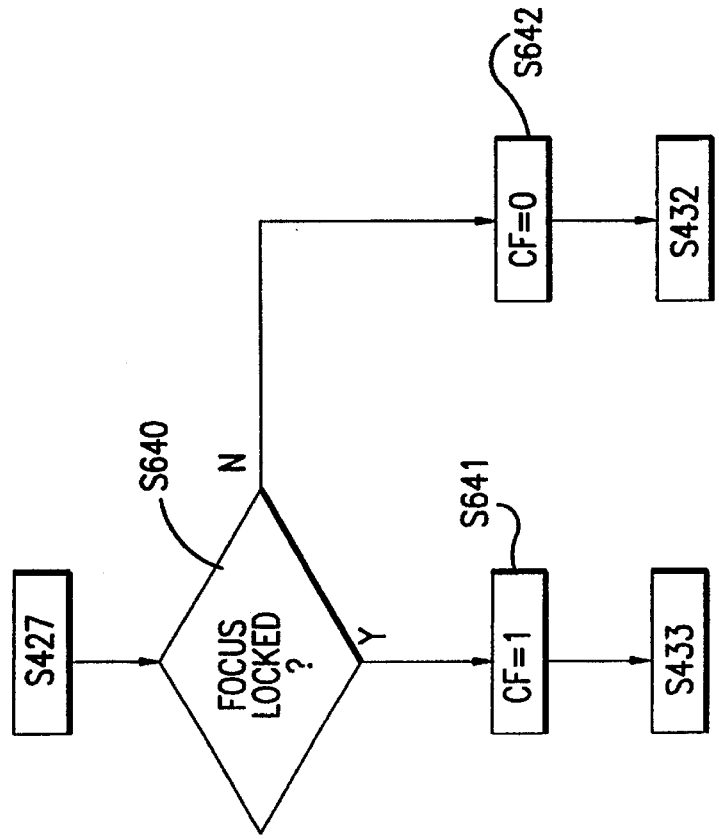

FIG. 24 is a flowchart detailing the sequence when the posture lock is released in accordance with the operation of the focus lock button 14. This flowchart would replace steps S429 through S432 in FIG. 18C.

In step S640, it is determined whether the focus lock button 14 is being operated and, if so, the tripod head control information is set (CF=1) in step S641. The microcomputer then moves to step S433. If, on the other hand, the focus lock button is not being operated in step S640, the tripod head control information is cleared (CF=0) in step S642 and the microcomputer then moves to step S432.

With this sequence, the posture lock is released only when the automatic focus adjustment apparatus has been focus locked. This eliminates the need to provide an exclusive posture lock release button, and the posture lock/release of the tripod head 3 is conducted in the same manner as the normal procedure wherein the setup is changed after the focus state is locked. Consequently, the photographer can conduct the posture lock/lock release sequence without difficulty.

Other features may also be varied. For example, in the above-described embodiments, the power source was described as being supplied from the camera body 1 to the lens 2' and the tripod head 3, but it would also be appropriate for power sources to be provided in the lens 2' and in the tripod head 3; for the camera controller 19 to detect the presence or absence of power sources in the lens 2' and the tripod head 3; and for the power source to be selected based on this determination. By providing a power source on the tripod head 3 side, posture lock releasing becomes possible through the posture lock release button 55 on the tripod head 3 alone, i.e., even when a conventional camera body not designed for use in the system of this invention is attached to the tripod head 3.

With the above-described embodiments, locking and releasing the posture of the tripod head can be controlled in accordance with an operational member provided on the optical device that is attached to the tripod head. Consequently, when the operator of the optical device changes the setup, it is possible to do so with a simple operation and without letting go of the optical device. Thus, setup changes can be achieved far more quickly and easily. In addition, ease of use is improved because locking and releasing of the tripod head posture can be related to focus adjustment.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An optical device system comprising:
   an optical device; and
   a support device to support said optical device, said support device comprising an anchor member and a variable member to which said optical device is removably mounted, said variable member being movable relative to said anchor member so as to adjust a posture of said optical device relative to said support device when said optical device is mounted to said variable member;
   a lock member that selectively locks and releases said variable member so that said variable member is held fixed or can move relative to said anchor member, respectively; and
   a control member housed in said optical device and that controls the locking and releasing of said lock member.

2. The system of claim 1, wherein:
   said optical device includes an operational member that controls operation of said optical device; and
   said control member controls the locking and releasing of said lock member, when said optical device is attached to said variable member, based on an operational state of said operational member.

3. The system of claim 2, wherein:
   said optical device comprises a signal generating device that generates signals according to the operational state of said operational member and an output unit to transmit said signals;
   said variable unit comprises an input unit to input said signals from said output unit; and
   said lock member locks or releases the posture of said variable member on the basis of said signals input by said input unit.

4. The system of claim 1, further comprising a detector on said optical device that determines whether said optical device is mounted to said support device, and wherein said control member is responsive to said detector to control said lock member.

5. The system of claim 1, wherein said optical device is a camera and said variable member is removably mounted to a body of said camera.

6. The system of claim 1, wherein said optical device is a camera and said variable member is removably mounted to a lens of said camera.

7. The system of claim 1, wherein said optical device includes a lens and said variable member is removably mounted to said lens.

8. The system of claim 1, wherein said variable member is swingably movable relative to said anchor member.

9. The system of claim 1, wherein said variable member is linearly movable relative to said anchor member.

10. The system of claim 1, wherein said lock member includes a motor that drives said variable member relative to said anchor member when said variable member is released.

11. The system of claim 1, wherein said support device includes a tripod.

12. The system of claim 1, wherein said optical device includes a display device that indicates whether said lock member is locked or released.

13. The system of claim 1, wherein said optical device includes a display device that indicates whether said optical device is mounted to said support device.

14. An optical device system comprising:

a support device having a stationary anchor member; and an optical device configured to be mounted to said anchor member, said optical device having a lock member that selectively locks and releases said optical device relative to said anchor member, and a control member that controls said lock member, said optical device being movable so as to change posture relative to said anchor member when mounted to said anchor member and when said lock member is released.

15. An optical device system comprising:

an optical device;

a support device comprising an anchor member and a variable member to which said optical device is mounted, said variable member being movable relative to said anchor member so as to adjust a posture of said optical device relative to said support device when said optical device is mounted to said variable member;

a lock member that fixes the posture of said optical device;

a detector that generates information indicating whether said lock member can be controlled by said optical device; and a controller disposed within said optical device and responsive to said information generated by said detector to control said lock member.

16. The system of claim 15, wherein said optical device includes a display device that indicates whether said lock member can be controlled by said optical device based on said information generated by said detector.

17. An optical device configured to be supported by a support device that includes an anchor member and a variable member that can be either locked or released so as to adjust a posture of the variable member relative to said anchor member, said optical device comprising:

a body; and a controller that outputs a signal to cause said variable member to be locked or unlocked relative to said anchor member.

18. The optical device of claim 17 wherein said body includes a connector through which said signal is provided to said support device.

19. The optical device of claim 17, wherein said optical device includes a lens unit having a connector through which said signal is provided to said support device.

20. A support device for supporting an optical device, said support device comprising:

an anchor member;

a variable member to which said optical device can be mounted, said variable member being movable relative to said anchor member so as to adjust the posture of said optical device relative to said support device when said optical device is mounted to said variable member;

a lock member that selectively locks and releases said variable member so that said variable member is held fixed or can move relative to said anchor member, respectively; and a connector to receive signals sent from said optical device, said lock member being responsive to said signals to lock and release said variable member.

21. A method for adjusting the posture of an optical device supported by a support device, said method comprising:

mounting said optical device to said support device;

operating an operative member located on said optical device;

generating signals in response to said operating of said operative member and transmitting said signals to a locking device;

operating said locking device in response to said signals to unlock a posture of said optical device relative to said support device; and moving said optical device relative to said support device.

22. The method of claim 21, wherein said operative member controls operation of said locking device only and said transmitting said signals comprises transmitting signals to said locking device only.

23. The method of claim 21, wherein said operative member controls operation of said locking device and said optical device and said transmitting said signals comprises transmitting signals to said locking device and to a controller that controls optical components of said optical device.

24. The method of claim 21, wherein:

said support device comprises an anchor member and a variable member to which said optical device is mounted, said variable member being movable relative to said anchor member so as to adjust the posture of said optical device relative to said support device when said optical device is mounted to said variable member;

said support device includes said locking device; and said moving said optical device comprises moving said variable member relative to said anchor member.

25. The method of claim 21, wherein:

said support device comprises an anchor member that remains stationary and said optical device is mounted directly to said anchor member; and said moving said optical device comprises moving said optical device relative to said anchor member.

* * * * *